(12) United States Patent
Terui et al.

(10) Patent No.: US 10,653,971 B2
(45) Date of Patent: May 19, 2020

(54) APPARATUS MOVEMENT SYSTEM, APPARATUS, APPARATUS MOVEMENT CONTROL METHOD, STORAGE MEDIUM HAVING STORED THEREIN APPARATUS MOVEMENT CONTROL PROGRAM, AND CARDBOARD MEMBER

(71) Applicant: NINTENDO CO., LTD., Kyoto (JP)

(72) Inventors: Akio Terui, Kyoto (JP); Yoko Fukuda, Kyoto (JP); Kenji Iwata, Kyoto (JP); Shinichi Kasuno, Kyoto (JP); Hitoshi Tsuchiya, Kyoto (JP); Kazuhiko Koriyama, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 16/003,379

(22) Filed: Jun. 8, 2018

(65) Prior Publication Data
US 2019/0001233 A1   Jan. 3, 2019

(30) Foreign Application Priority Data

Jun. 28, 2017   (JP) .................................. 2017-126279

(51) Int. Cl.
*A63H 33/16*   (2006.01)
*A63H 11/02*   (2006.01)
(Continued)

(52) U.S. Cl.
CPC ....... *A63H 18/007* (2013.01); *A63F 13/2145* (2014.09); *A63F 13/23* (2014.09);
(Continued)

(58) Field of Classification Search
CPC ...... A63H 18/007; A63H 11/00; A63H 11/02; A63H 30/04; A63H 33/16
See application file for complete search history.

(56) References Cited

U.S. PATENT DOCUMENTS

| 3,196,580 A | * | 7/1965 | Rakestraw | ........... | A63H 18/007 |
| | | | | | 446/484 |
| 4,202,132 A | * | 5/1980 | Fischer | .................. | A63H 33/06 |
| | | | | | 446/127 |

(Continued)

FOREIGN PATENT DOCUMENTS

| JP | 11-342275 | 12/1999 |
| JP | 2004-275885 | 10/2004 |

(Continued)

OTHER PUBLICATIONS

Partial European Search Report dated Dec. 5, 2018 issued in European Application No. 18176434.1 (13 pgs.).

(Continued)

*Primary Examiner* — Eugene L Kim
*Assistant Examiner* — Alyssa M Hylinski
(74) *Attorney, Agent, or Firm* — Nixon & Vanderhye, P.C.

(57) ABSTRACT

A first grounded portion is at least one of portions of an apparatus that are grounded, and vibrates in accordance with a vibration of at least a first vibration unit. A second grounded portion is at least one of the portions of the apparatus that are grounded, and vibrates in accordance with a vibration of at least a second vibration unit. Then, a first control signal for controlling the vibration of the first vibration unit and a second control signal for controlling the vibration of the second vibration unit are generated, whereby, in a state where the apparatus is on a certain surface, the apparatus moves on the certain surface by a vibration of the first grounded portion grounded on the certain surface and/or a vibration of the second grounded portion grounded on the certain surface.

20 Claims, 16 Drawing Sheets

(51) Int. Cl.
*A63H 30/04* (2006.01)
*A63H 18/00* (2006.01)
*A63F 13/2145* (2014.01)
*A63F 13/23* (2014.01)
*A63F 13/24* (2014.01)
*A63F 13/285* (2014.01)
*A63F 13/92* (2014.01)
*A63F 13/95* (2014.01)

(52) U.S. Cl.
CPC ............ *A63F 13/24* (2014.09); *A63F 13/285* (2014.09); *A63F 13/92* (2014.09); *A63F 13/95* (2014.09); *A63H 11/02* (2013.01); *A63H 30/04* (2013.01); *A63H 33/16* (2013.01); *A63F 2300/1043* (2013.01); *A63F 2300/1075* (2013.01); *A63F 2300/204* (2013.01); *A63F 2300/206* (2013.01)

(56) References Cited

U.S. PATENT DOCUMENTS

| | | | | |
|---|---|---|---|---|
| 4,219,957 A * | 9/1980 | Kakuta | ................ | A63H 18/007 446/230 |
| 5,149,291 A * | 9/1992 | Di Franco | ............ | A63H 18/007 446/3 |
| 5,163,862 A * | 11/1992 | Philips | ................... | A63H 33/06 446/114 |
| 6,826,449 B1 * | 11/2004 | Abu-Taha | ............. | H02P 25/032 446/3 |
| 8,038,503 B2 * | 10/2011 | Norman | ................ | A63H 11/02 446/351 |
| 9,895,606 B1 * | 2/2018 | Kamata | .................... | A63F 13/24 |
| 2002/0111117 A1 * | 8/2002 | Ho | ......................... | A63H 17/00 446/456 |
| 2008/0146117 A1 * | 6/2008 | Tiburzi | ................. | A63H 11/02 446/358 |
| 2009/0311941 A1 * | 12/2009 | Bickerton | .............. | A63H 11/02 446/3 |
| 2011/0076916 A1 | 3/2011 | Norman et al. | | |
| 2013/0095723 A1 * | 4/2013 | Sadri | ...................... | A63H 33/08 446/101 |

FOREIGN PATENT DOCUMENTS

| | | |
|---|---|---|
| JP | 2009-125403 | 6/2009 |
| JP | 2013-48809 | 3/2013 |
| JP | 2013-138822 | 7/2013 |

OTHER PUBLICATIONS

Office Action dated May 29, 2018 issued in Japanese Application No. 2017-126279 (8 pgs.) and Translation (6 pgs.).

Norihisa Iijima, Engadget Japanese Version, online, Mar. 3, 2017, searched on May 18, 2018, https://japanese.engadget.com/2017 03/02/ switch-open/ (17 pgs.).

Nintendo Switch, Wikipedia, online, Feb. 28, 2017, seached on May 21, 2018, https://ja.wikipedia.org/w /index.php?title=Nintendo_ Switch&oldid=63188048 (4 pgs.).

* cited by examiner

F I G. 1 8
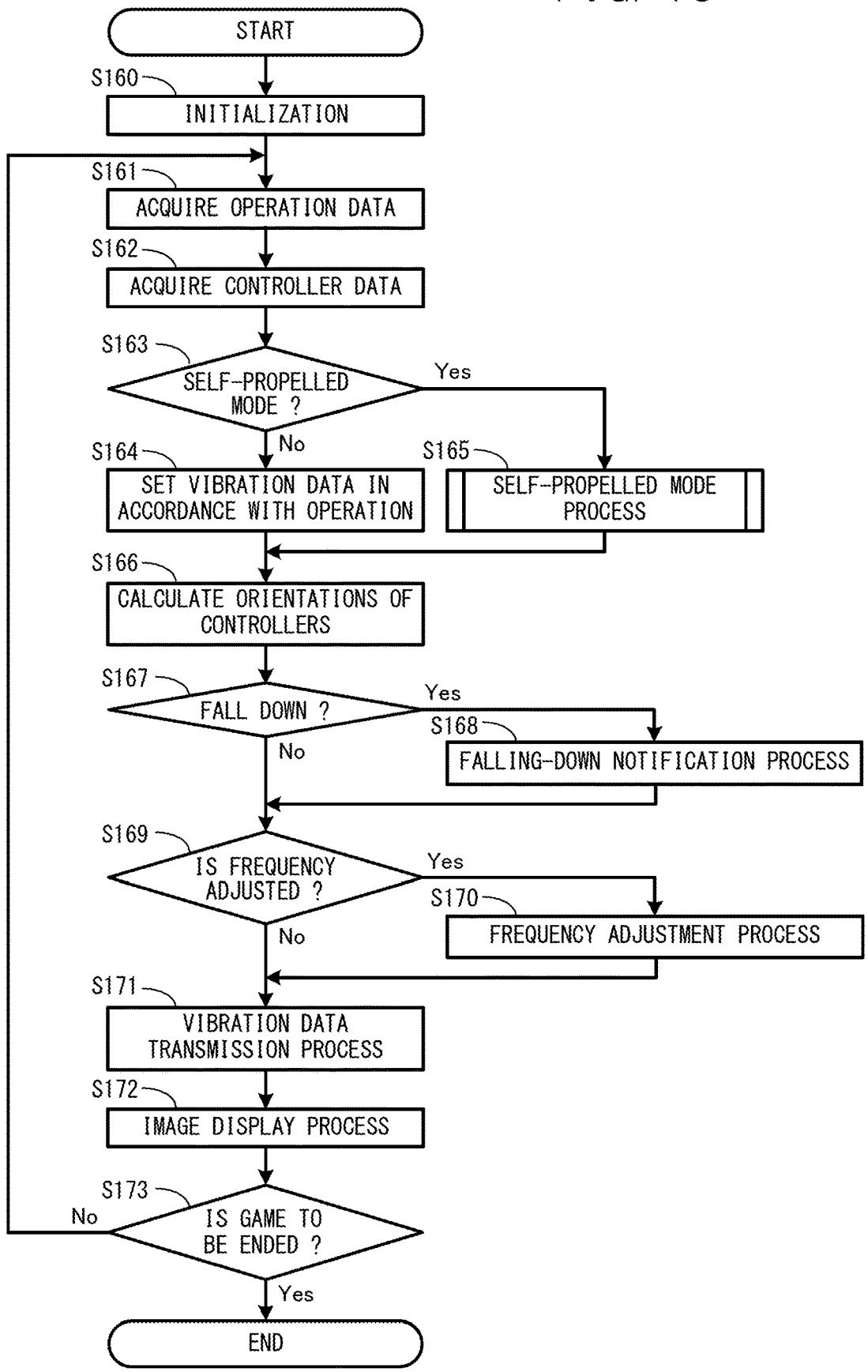

APPARATUS MOVEMENT SYSTEM, APPARATUS, APPARATUS MOVEMENT CONTROL METHOD, STORAGE MEDIUM HAVING STORED THEREIN APPARATUS MOVEMENT CONTROL PROGRAM, AND CARDBOARD MEMBER

CROSS REFERENCE TO RELATED APPLICATION

The disclosure of Japanese Patent Application No. 2017-126279, filed on Jun. 28, 2017, is incorporated herein by reference.

FIELD

The technology shown here relates to an apparatus for moving by a vibration, relates to an apparatus movement system, an apparatus movement control method, and a storage medium having stored therein an apparatus movement control program for moving the apparatus, and relates to a cardboard member capable of forming the main body of the apparatus.

BACKGROUND AND SUMMARY

Conventionally, there is a toy that moves by imparting a vibration to the toy. For example, the toy moves by a thrust force due to a vibration generated by a piezoelectric element provided within the toy.

The toy, however, merely moves in a moving direction set in advance, and there is room for improvement in the variety of movements using vibrations.

Therefore, it is an object of an exemplary embodiment to provide an apparatus movement system, an apparatus, an apparatus movement control method, a storage medium having stored therein an apparatus movement control program, and a cardboard member that are capable of improving the variety of movements using vibrations.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

In an exemplary configuration of an apparatus movement system according to the exemplary embodiment, an apparatus movement system controls a movement of an apparatus. The apparatus comprises a first vibration unit, a second vibration unit, a first grounded portion, and a second grounded portion. The second vibration unit is a certain distance away from the first vibration unit. A first grounded portion is at least one of portions of the apparatus that are grounded, and is configured to vibrate in accordance with a vibration of at least the first vibration unit. A second grounded portion is one of the portions of the apparatus that are grounded, and is configured to vibrate in accordance with a vibration of at least the second vibration unit. The apparatus movement system comprises a computer configured to generate a first control signal for controlling the vibration of the first vibration unit and a second control signal for controlling the vibration of the second vibration unit. In a state where the apparatus is on a certain surface, the apparatus moves on the certain surface by the vibration of the first grounded portion grounded on the certain surface and/or the vibration of the second grounded portion grounded on the certain surface.

Based on the above, vibrations are imparted to an apparatus, whereby it is possible to move the apparatus on a certain surface in real space. Two independent vibrations to be imparted to the apparatus are controlled, whereby it is possible to vary movements due to vibrations.

Further, the first vibration unit may be on a left side of the apparatus with respect to a moving direction of the apparatus. The second vibration unit may be on a right side of the apparatus with respect to the moving direction of the apparatus.

Based on the above, vibration sections are attached to the left and right with respect to a moving direction of the apparatus. Thus, it is possible to stably move the apparatus.

Further, the first grounded portion may be on a left side of the apparatus with respect to a moving direction of the apparatus. The second grounded portion may be on a right side of the apparatus with respect to the moving direction of the apparatus.

Based on the above, grounded portions are provided on the same sides as vibration sections attached to the left and right with respect to a moving direction. Thus, it is easy to transmit a vibration to each of the grounded portions.

Further, the first grounded portion may vibrate more strongly by the vibration of the first vibration unit than by the vibration of the second vibration unit. The second grounded portion may vibrate more strongly by the vibration of the second vibration unit than by the vibration of the first vibration unit.

Based on the above, it is easy to control a vibration to be transmitted to each of grounded portions.

Further, the apparatus may further comprise a main body, a first housing, and a second housing. The first housing comprises the first vibration unit. The second housing comprises the second vibration unit. The main body comprises a first engagement portion and a second engagement portion. The first engagement portion is detachably engaged with the first housing. The second engagement portion is detachably engaged with the second housing.

Based on the above, it is possible to configure the apparatus in a form in which a vibration section included in a housing is added to a main body portion of the apparatus for use.

Further, the first engagement portion may comprise a first fitting portion. The first fitting portion is configured to fit at least a part of the first housing. The second engagement portion may comprise a second fitting portion. The second fitting portion is configured to fit at least a part of the second housing.

Based on the above, it is possible to certainly fix the housing that includes the vibration section. Thus, it is possible to efficiently transmit a vibration of the vibration section to the main body portion.

Further, the first fitting portion may be formed so as to fit at least a part of the first housing near a place where the first vibration unit is installed in the first housing. The second fitting portion may be formed so as to fit at least a part of the second housing near a place where the second vibration unit is installed in the second housing.

Based on the above, it is possible to efficiently transmit the vibration of the vibration section to the main body portion.

Further, the apparatus movement system may further comprise a control apparatus. The control apparatus is separate from the apparatus and comprises the computer configured to generate the control signal. The computer of the control apparatus further transmits the first control signal and the second control signal generated in the generation of the control signal to the apparatus.

Based on the above, it is possible to control a movement of the apparatus using a separate control apparatus.

Further, the control apparatus may further comprise an operation unit. The operation unit is configured to be operated by a user. In the generation of the control signal, the control apparatus may generate the first control signal and the second control signal based on an operation on the operation unit.

Based on the above, it is possible to control the movement of the apparatus by operating an operation section included in the separate control apparatus.

Further, in the generation of the control signal, based on a content of a user operation, frequencies at which the first vibration unit and/or the second vibration unit vibrate are set, and the first control signal and/or the second control signal may be generated.

Based on the above, it is possible to adjust an optimal vibration frequency for moving the apparatus.

Further, the apparatus may further comprise an image capturing unit. The image capturing unit is configured to capture a portion around the apparatus. In the generation of the control signal, based on a captured image captured by the image capturing unit, the first control signal and the second control signal may be generated.

Based on the above, it is possible to automatically move the apparatus using a captured image.

Further, the first grounded portion may have at least three portions of the apparatus that are grounded. The second grounded portion may have at least three portions of the apparatus that are grounded.

Based on the above, it is easy to move the apparatus.

Further, the computer may further detect an orientation of the apparatus. Based on a detection result of the orientation, the computer estimates a situation where the apparatus moves.

Based on the above, it is possible to notify a user of an abnormal orientation, for example, in a case where the apparatus falls down.

Further, the main body may be formed by folding at least one cardboard.

Based on the above, it is possible to assemble a main body portion by folding a cardboard member.

Further, the apparatus movement system may be carried out in the forms of an apparatus and an apparatus movement control method.

Further, in an exemplary configuration of a non-transitory computer-readable storage medium having stored therein an apparatus movement control program according to the exemplary embodiment, an apparatus movement control program is executed by a computer included in a control apparatus for controlling a movement of an apparatus comprising a first vibration unit, a second vibration unit a certain distance away from the first vibration unit, and an image capturing unit configured to capture a portion around the apparatus. The apparatus movement control program causes the computer to execute: generating a first control signal for controlling a vibration of the first vibration unit, thereby vibrating at least the first vibration unit, thereby vibrating a first grounded portion which is at least one of portions of the apparatus that are grounded, thereby moving the apparatus on a certain surface; and generating a second control signal for controlling a vibration of the second vibration unit, thereby vibrating at least the second vibration unit, thereby vibrating a second grounded portion which is at least one of the portions of the apparatus that are grounded, thereby moving the apparatus on the certain surface. In the generation of the first control signal, based on a captured image captured by the image capturing unit, the first control signal is generated, In the generation of the second control signal, based on a captured image captured by the image capturing unit, the second control signal is generated.

Based on the above, vibrations are imparted to an apparatus, whereby it is possible to move the apparatus on a certain surface in real space. Two independent vibrations to be imparted to the apparatus are controlled, whereby it is possible to vary movements due to vibrations. Further, it is also possible to automatically move the apparatus using a captured image captured by the apparatus.

Further, in an exemplary configuration of a cardboard member according to the exemplary embodiment, a cardboard member is configured to form an apparatus to and from which a first game controller comprising a first vibration unit and a second game controller comprising a second vibration unit are attached and detached. The apparatus comprises a first engagement portion, a second engagement portion, a first grounded portion, and a second grounded portion. With the first engagement portion, the first game controller is detachably engaged by fitting at least a part of the first game controller. With the second engagement portion, the second game controller is detachably engaged by fitting at least a part of the second game controller. The first grounded portion is at least one of portions of the apparatus that are grounded, and is configured to vibrate in accordance with a vibration of at least the first vibration unit of the first game controller attached to the first engagement portion. The second grounded portion is at least one of the portions of the apparatus that are grounded, and is configured to vibrate in accordance with a vibration of at least the second vibration unit of the second game controller attached to the second engagement portion. The cardboard member is folded, thereby integrally forming the apparatus comprising the first engagement portion, the second engagement portion, the first grounded portion, and the second grounded portion.

Based on the above, a cardboard member is folded, whereby it is possible to configure an apparatus for moving in real space, by attaching a first game controller and a second game controller to the apparatus.

According to the exemplary embodiment, vibrations to be imparted to an apparatus are controlled, whereby it is possible to vary movements due to vibrations.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 18 is a flow chart showing a non-limiting example of a control process executed by the main body apparatus 2.

DETAILED DESCRIPTION OF NON-LIMITING EXAMPLE EMBODIMENTS

Figure 1:
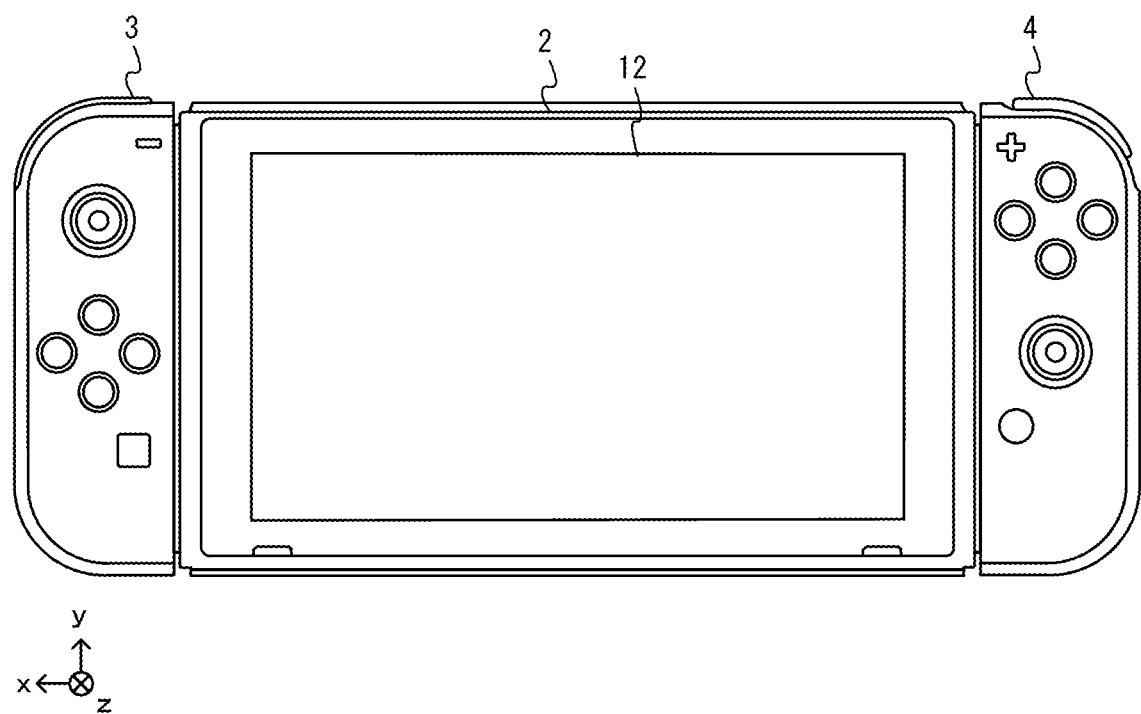
FIG. 1 is a diagram showing a non-limiting example of the state where a left controller 3 and a right controller 4 are attached to a main body apparatus 2.

An apparatus movement system according to an exemplary embodiment is described below. A game system 1, which is an example of the apparatus movement system according to the exemplary embodiment, includes a main body apparatus (an information processing apparatus; which functions as a game apparatus main body in the exemplary embodiment) 2, and an apparatus (a moving device 200) to which a left controller 3 and a right controller 4 are attached. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Further, the moving device 200 in the game system 1 can be used as a toy that moves by a vibration, by attaching controllers (e.g., the left controller 3 and the right controller 4) to the inside of the moving device 200. Hereinafter, first, the hardware configuration of the game system 1 according to the exemplary embodiment is described, and then, the control of the game system 1 according to the exemplary embodiment is described.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs. It should be noted that in the exemplary embodiment, the longitudinal direction of a main surface of the game system 1 is referred to as a "horizontal direction" (also as a "left-right direction"), the short direction of the main surface is referred to as a "vertical direction" (also as an "up-down direction"), and a direction perpendicular to the main surface is referred to as a depth direction (also as a "front-back direction"). Further, to facilitate the understanding of directions in the game system 1, three axial (xyz axes) directions are defined for the game system 1. Specifically, as shown in FIG. 1, in the game system 1, the depth direction of the display 12 from a front surface, on which the display 12 is provided, to a back surface is defined as a positive z-axis direction. In the horizontal direction perpendicular to the depth direction, the direction from the right to left (the direction from the attachment position of the right controller 4 to the attachment position of the left controller 3) is defined as a positive x-axis direction. In the up-down direction perpendicular to the depth direction and the horizontal direction, the direction upward along the display 12 is defined as a positive y-axis direction.

Figure 2:
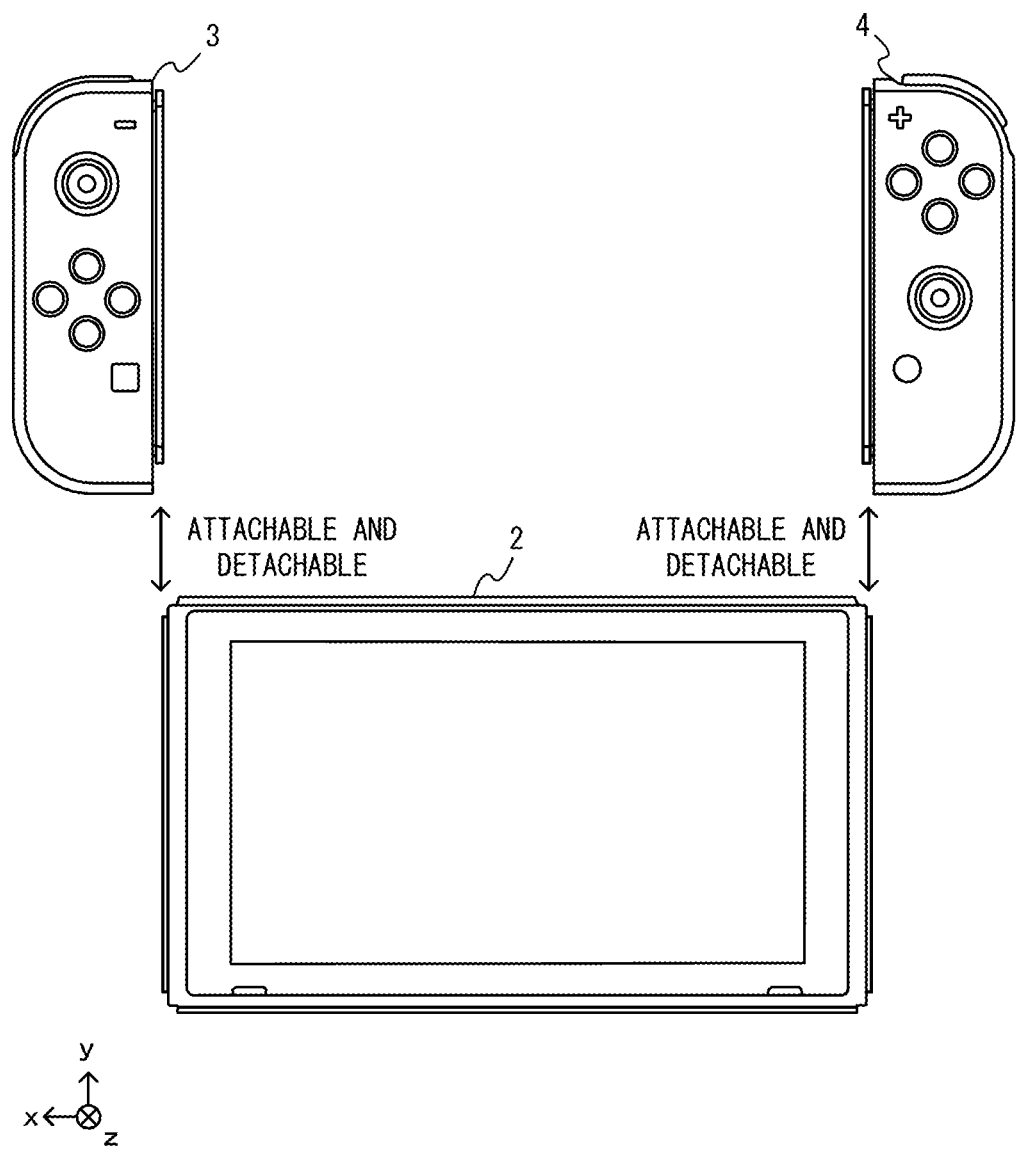
FIG. 2 is a diagram showing a non-limiting example of the state where each of the left controller 3 and the right controller 4 is detached from the main body apparatus 2.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller". Further, in the exemplary embodiment, two controllers (e.g., the left controller 3 and the right controller 4) are attached to a moving object 201 (i.e., a main body portion of the moving device 200), whereby, in accordance with the fact that the user performs an operation using the main body apparatus 2, it is possible to move in real space the moving object 201 to which the two controllers are attached.

Figure 3:
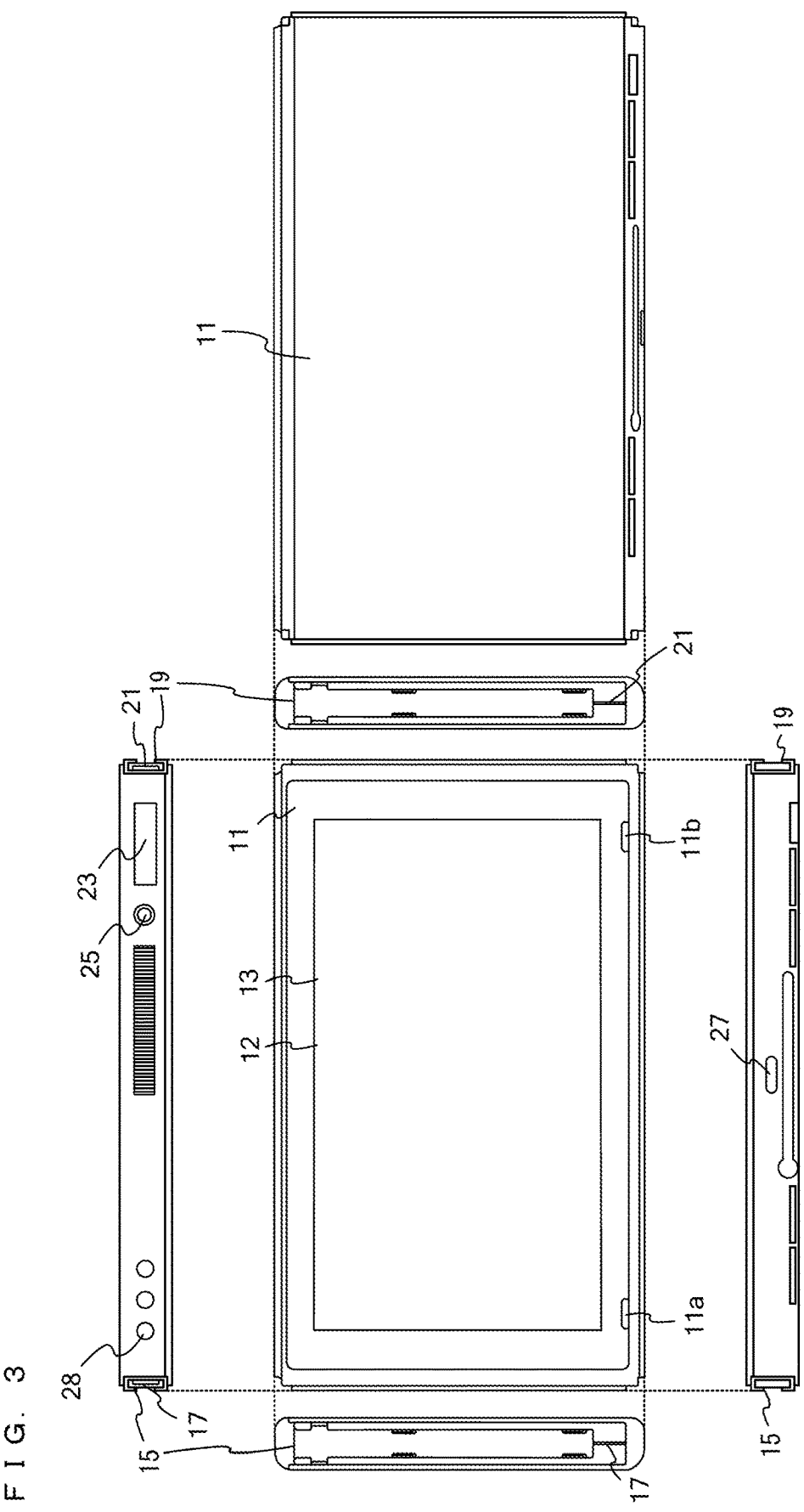
FIG. 3 is six orthogonal views showing a non-limiting example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

As shown in FIG. 3, the main body apparatus 2 includes a left rail member 15 on the left side surface of the housing 11. The left rail member 15 is a member for detachably attaching the left controller 3 to the main body apparatus 2. The left rail member 15 is provided so as to extend along the up-down direction on the left side surface of the housing 11. The left rail member 15 is shaped so as to be engaged with a slider (i.e., a slider 40 shown in FIG. 4) of the left controller 3, and a slide mechanism is formed of the left rail member 15 and the slider 40. With this slide mechanism, it is possible to slidably and detachably attach the left controller 3 to the main body apparatus 2. Further, the main body apparatus 2 includes a left terminal 17, which is a terminal for the main body apparatus 2 to perform wired communication with the left controller 3 when the left controller 3 is attached to the main body apparatus 2.

Further, on the right side surface of the housing 11, components similar to the components provided on the left side surface are provided. That is, the main body apparatus 2 includes a right rail member 19 on the right side surface of the housing 11. The right rail member 19 is provided so as to extend along the up-down direction on the right side surface of the housing 11. The right rail member 19 is shaped so as to be engaged with a slider (i.e., a slider 62 shown in FIG. 5) of the right controller 4, and a slide mechanism is formed of the right rail member 19 and the slider 62. With this slide mechanism, it is possible to slidably and detachably attach the right controller 4 to the main body apparatus 2. Further, the main body apparatus 2 includes a right terminal 21, which is a terminal for the main body apparatus 2 to perform wired communication with the right controller 4 when the right controller 4 is attached to the main body apparatus 2.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
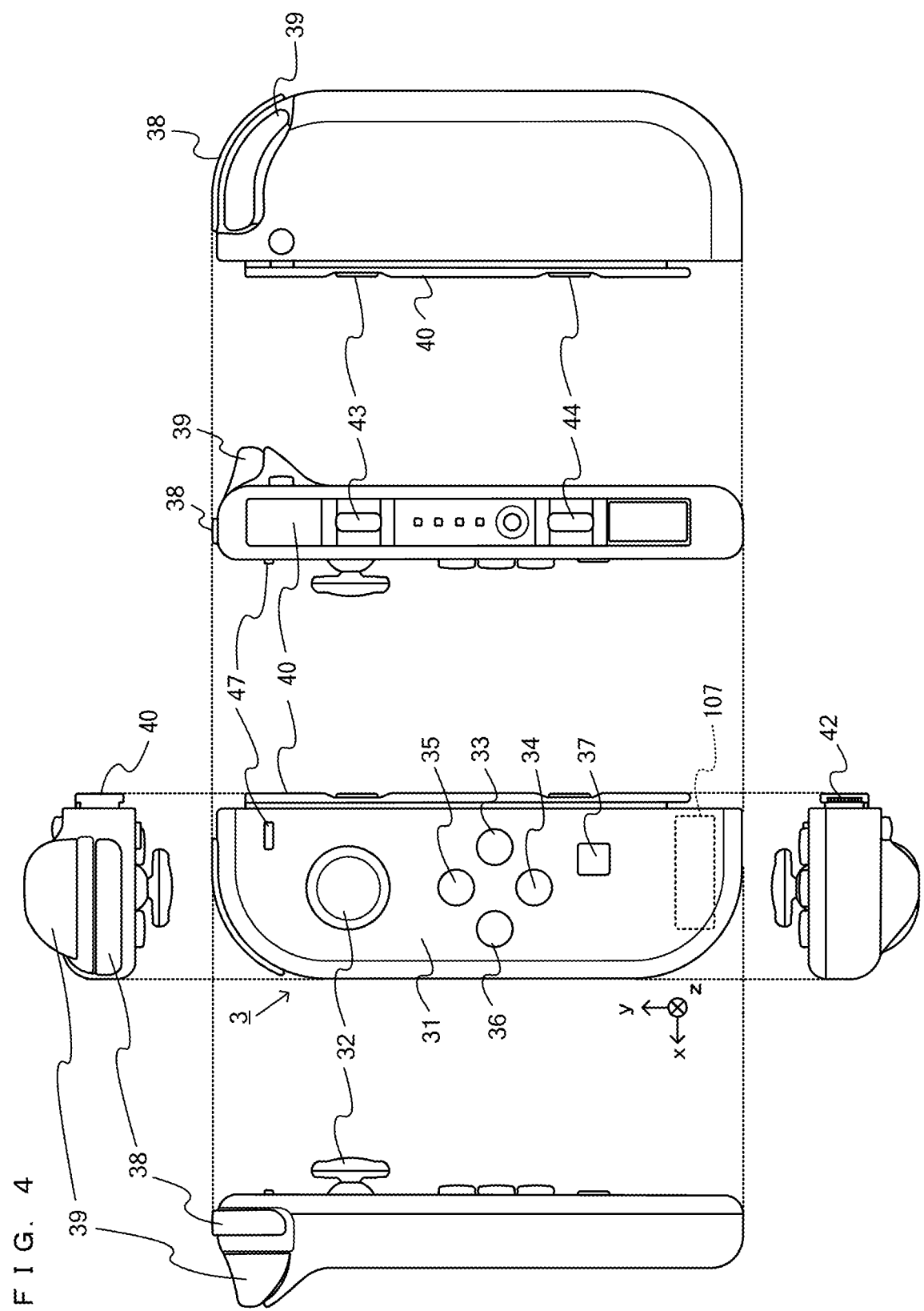
FIG. 4 is six orthogonal views showing a non-limiting example of the left controller 3.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

The left controller 3 includes the slider 40 described above. As shown in FIG. 4, the slider 40 is provided so as to extend in the up-down direction on the right side surface of the housing 31. The slider 40 is shaped so as to be engaged with the left rail member 15 of the main body apparatus 2 (more specifically, grooves in the left rail member 15). Thus, the slider 40 engaged with the left rail member 15 is fixed so as not to be detached in a direction perpendicular to the slide direction (in other words, the direction in which the left rail member 15 extends). Further, the left controller 3 includes a terminal 42 for the left controller 3 to perform wired communication with the main body apparatus 2 when the left controller 3 is attached to the main body apparatus 2.

Figure 5:
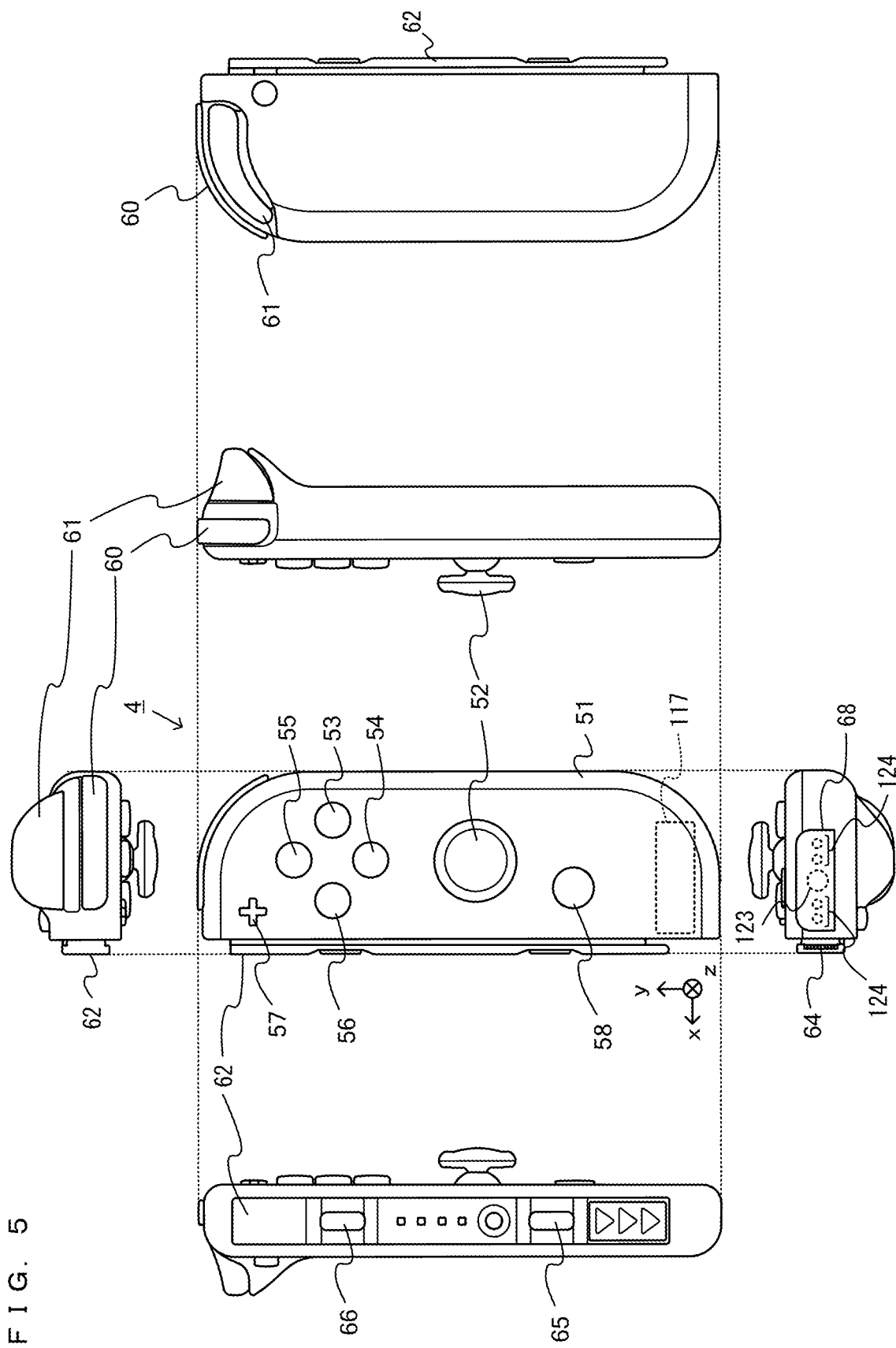
FIG. 5 is six orthogonal views showing a non-limiting example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, a window portion 68 is provided on a lower side surface of the housing 51. Although the details will be described later, the right controller 4 includes an infrared image capturing section 123 and an infrared light-emitting section 124, which are placed within the housing 51. The infrared image capturing section 123 captures a portion around the right controller 4 through the window portion 68 such that a down direction of the right controller 4 (a negative y-axis direction shown in FIG. 5) is the image capturing direction. The infrared light-emitting section 124 emits infrared light through the window portion 68 to an image capturing target to be captured by the infrared image capturing section 123 such that a predetermined range about the down direction of the right controller 4 (the negative y-axis direction shown in FIG. 5) is the emission range. The window portion 68 is used to protect a lens of a camera of the infrared image capturing section 123, a light emitter of the infrared light-emitting section 124, and the like and composed of a material (e.g., a transparent material) that transmits light of a wavelength sensed by the camera and light emitted from the light emitter. It should be noted that the window portion 68 may be a hole formed in the housing 51. Further, in the exemplary embodiment, the infrared image capturing section 123 itself includes a filter member for inhibiting the transmission of light of a wavelength other than light sensed by the camera (infrared light in the exemplary embodiment). In another exemplary embodiment, the window portion 68 may have the function of a filter.

The right controller 4 includes a slider mechanism similar to that of the left controller 3. That is, the right controller 4 includes the slider 62 described above. As shown in FIG. 5, the slider 62 is provided so as to extend in the up-down direction on the left side surface of the housing 51. The slider 62 is shaped so as to be engaged with the right rail member 19 of the main body apparatus 2 (more specifically, grooves in the right rail member 19). Thus, the slider 62 engaged with the right rail member 19 is fixed so as not to be detached in a direction perpendicular to the slide direction (in other words, the direction in which the right rail member 19 extends). Further, the right controller 4 includes a terminal 64 for the right controller 4 to perform wired communication with the main body apparatus 2 when the right controller 4 is attached to the main body apparatus 2.

Figure 6:
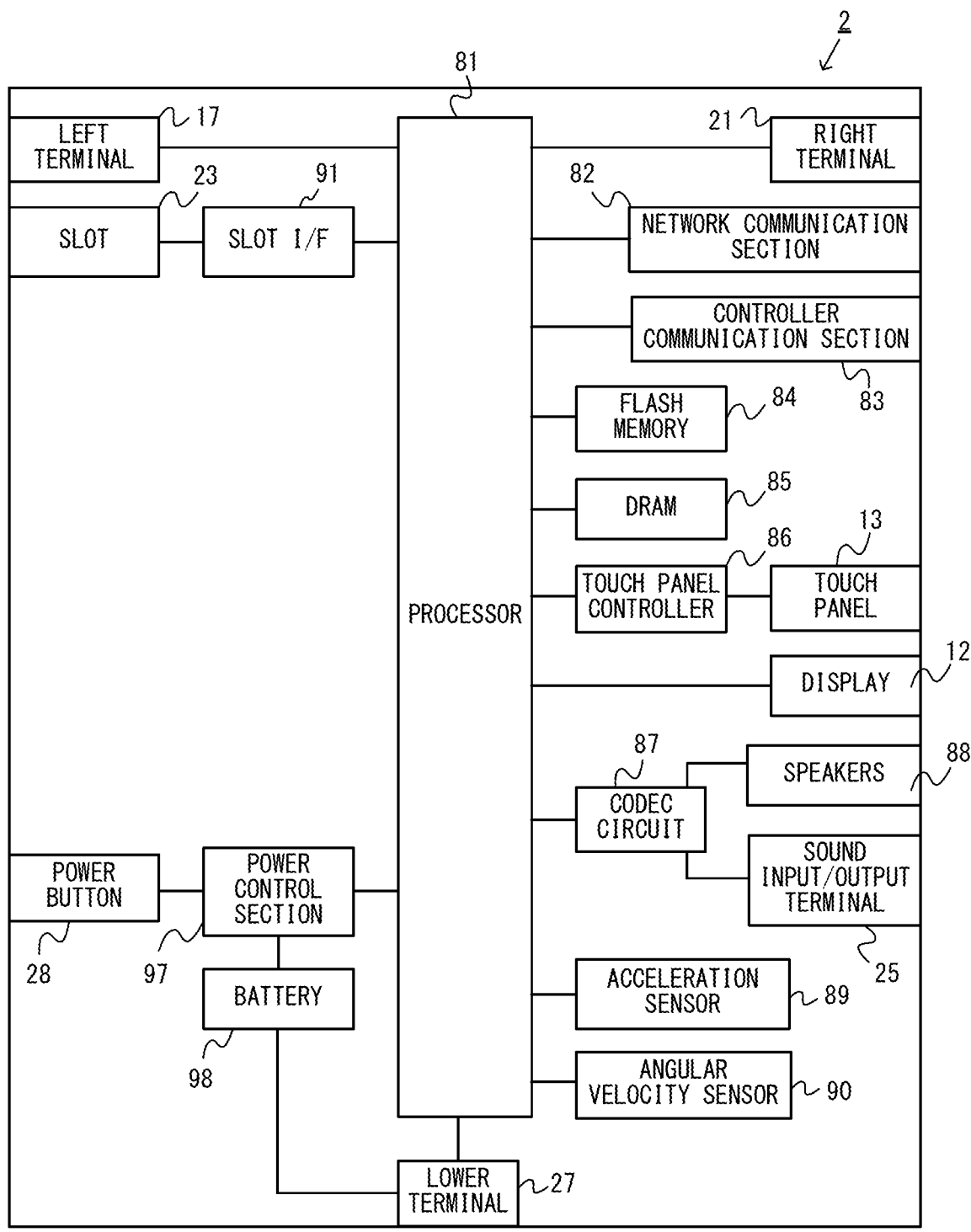
FIG. 6 is a block diagram showing a non-limiting example of the internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

Further, the main body apparatus 2 includes an acceleration sensor 89. In the exemplary embodiment, the acceleration sensor 89 detects the magnitudes of accelerations along predetermined three axial (e.g., xyz axes shown in FIG. 1) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the xyz axes shown in FIG. 1). It should be noted that the angular velocity sensor 90 may detect an angular velocity about one axis or angular velocities about two axes.

The acceleration sensor 89 and the angular velocity sensor 90 are connected to the processor 81, and the detection results of the acceleration sensor 89 and the angular velocity sensor 90 are output to the processor 81. Based on the detection results of the acceleration sensor 89 and the angular velocity sensor 90, the processor 81 can calculate information regarding the motion and/or the orientation of the main body apparatus 2.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
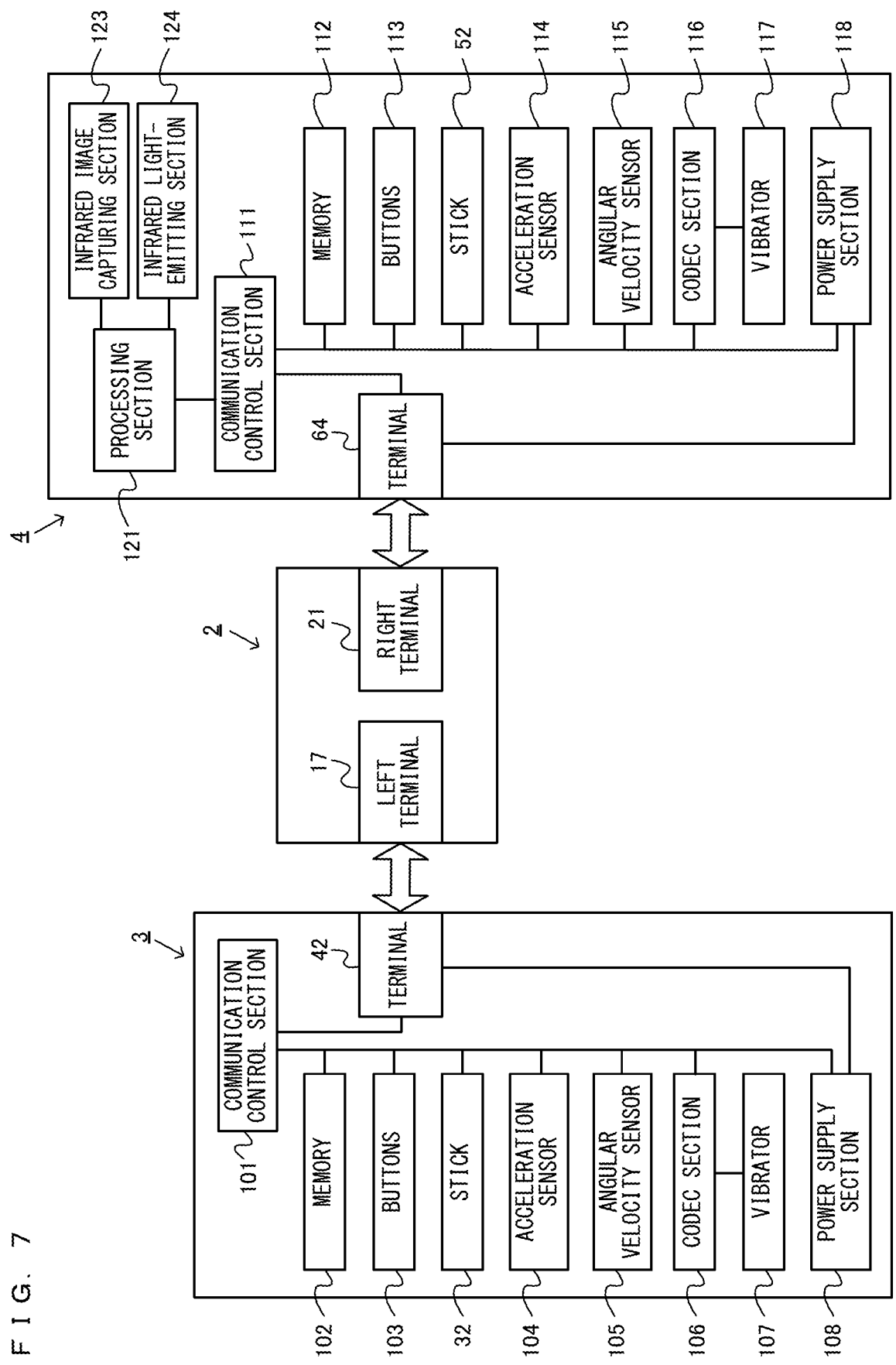
FIG. 7 is a block diagram showing non-limiting examples of the internal configurations of the main body apparatus 2, the left controller 3, and the right controller 4.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a vibrator 107 for giving notification to the user by a vibration. In the exemplary embodiment, the vibrator 107 is controlled by a command from the main body apparatus 2. That is, if receiving the above command from the main body apparatus 2, the communication control section 101 drives the vibrator 107 in accordance with the received command. Here, the left controller 3 includes a codec section 106. If receiving the above command, the communication control section 101 outputs a control signal corresponding to the command to the codec section 106. The codec section 106 generates a driving signal for driving the vibrator 107 from the control signal from the communication control section 101 and outputs the driving signal to the vibrator 107. Consequently, the vibrator 107 operates. It should be noted that as shown in FIG. 4, the vibrator 107 according to the exemplary embodiment is provided near a lower end portion within the left controller 3 (near a lower side surface formed further in a negative y-axis direction).

More specifically, the vibrator 107 is a linear vibration motor. Unlike a regular motor that rotationally moves, the linear vibration motor is driven in a predetermined direction in accordance with an input voltage and therefore can be vibrated at an amplitude and a frequency corresponding to the waveform of the input voltage. In the exemplary embodiment, a vibration control signal transmitted from the main body apparatus 2 to the left controller 3 may be a digital signal representing the frequency and the amplitude every unit of time. In another exemplary embodiment, the main body apparatus 2 may transmit information indicating the waveform itself. The transmission of only the amplitude and the frequency, however, enables a reduction in the amount of communication data. Additionally, to further reduce the amount of data, only the differences between the numerical values of the amplitude and the frequency at that time and the previous values may be transmitted, instead of the numerical values. In this case, the codec section 106 converts a digital signal indicating the values of the amplitude and the frequency acquired from the communication control section 101 into the waveform of an analog voltage and inputs a voltage in accordance with the resulting waveform, thereby driving the vibrator 107. Thus, the main body apparatus 2 changes the amplitude and the frequency to be transmitted every unit of time and thereby can control the amplitude and the frequency at which the vibrator 107 is to be vibrated at that time. It should be noted that not only a single amplitude and a single frequency, but also two or more amplitudes and two or more frequencies may be transmitted from the main body apparatus 2 to the left controller 3. In this case, the codec section 106 combines waveforms indicated by the plurality of received amplitudes and frequencies and thereby can generate the waveform of a voltage for controlling the vibrator 107.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

Further, the right controller 4 includes a vibrator 117 and a codec section 116. The vibrator 117 and the codec section 116 operate similarly to the vibrator 107 and the codec section 106, respectively, of the left controller 3. That is, in accordance with a command from the main body apparatus 2, the communication control section 111 causes the vibrator 117 to operate, using the codec section 116. It should be noted that as shown in FIG. 5, the vibrator 117 according to the exemplary embodiment is provided near a lower end portion within the right controller 4 (near the lower side surface formed further in the negative y-axis direction).

Further, the right controller 4 includes the infrared image capturing section 123. The infrared image capturing section 123 includes an infrared camera for capturing a portion around the right controller 4. As an example, the main body apparatus 2 and/or the right controller 4 calculate information of a captured image (e.g., information related to the luminance of a plurality of blocks into which at least the entirety of a partial area of a captured image is divided or the like), and based on the calculated information, determine a change in the portion around the right controller 4. Further, the infrared image capturing section 123 may capture an image using ambient light, but in the exemplary embodiment, includes the infrared light-emitting section 124, which emits infrared light. The infrared light-emitting section 124 emits infrared light, for example, in synchronization with the timing when the infrared camera captures an image. Then, the infrared light emitted from the infrared light-emitting section 124 is reflected by an image capturing target, and the infrared camera receives the reflected infrared light, thereby acquiring an image of the infrared light. This enables the infrared image capturing section 123 to obtain a clearer infrared light image. It should be noted that the infrared image capturing section 123 and the infrared light-emitting section 124 may be provided as different devices in the right controller 4, or may be provided as a single device in the same package in the right controller 4. Further, in the exemplary embodiment, the infrared image capturing section 123 including an infrared camera is used. In another exemplary embodiment, a visible light camera (a camera using a visible light image sensor) may be used as image capturing means, instead of the infrared camera.

The right controller 4 includes a processing section 121. The processing section 121 is connected to the communication control section 111. Further, the processing section 121 is connected to the infrared image capturing section 123 and the infrared light-emitting section 124.

The processing section 121 includes a CPU, a memory, and the like. Based on a predetermined program (e.g., an application program for performing image processing and various calculations) stored in a storage device (e.g., a non-volatile memory or the like) (not shown) included in the right controller 4, and in accordance with a command from the main body apparatus 2, the processing section 121 performs the process of managing the infrared image capturing section 123. For example, the processing section 121 causes the infrared image capturing section 123 to perform an image capturing operation. Further, the processing section 121 acquires and/or calculates information based on an image capturing result (information of a captured image, information calculated from this information, or the like) and transmits the information to the main body apparatus 2 via the communication control section 111. Further, in accordance with a command from the main body apparatus 2, the processing section 121 performs the process of managing the infrared light-emitting section 124. For example, in accordance with a command from the main body apparatus 2, the processing section 121 controls the light emission of the infrared light-emitting section 124. It should be noted that a memory used by the processing section 121 to perform processing may be provided in the processing section 121 or may be the memory 112.

The right controller 4 includes a power supply section 118. The power supply section 118 has a function similar to that of the power supply section 108 of the left controller 3 and operates similarly to the power supply section 108.

Figure 8:
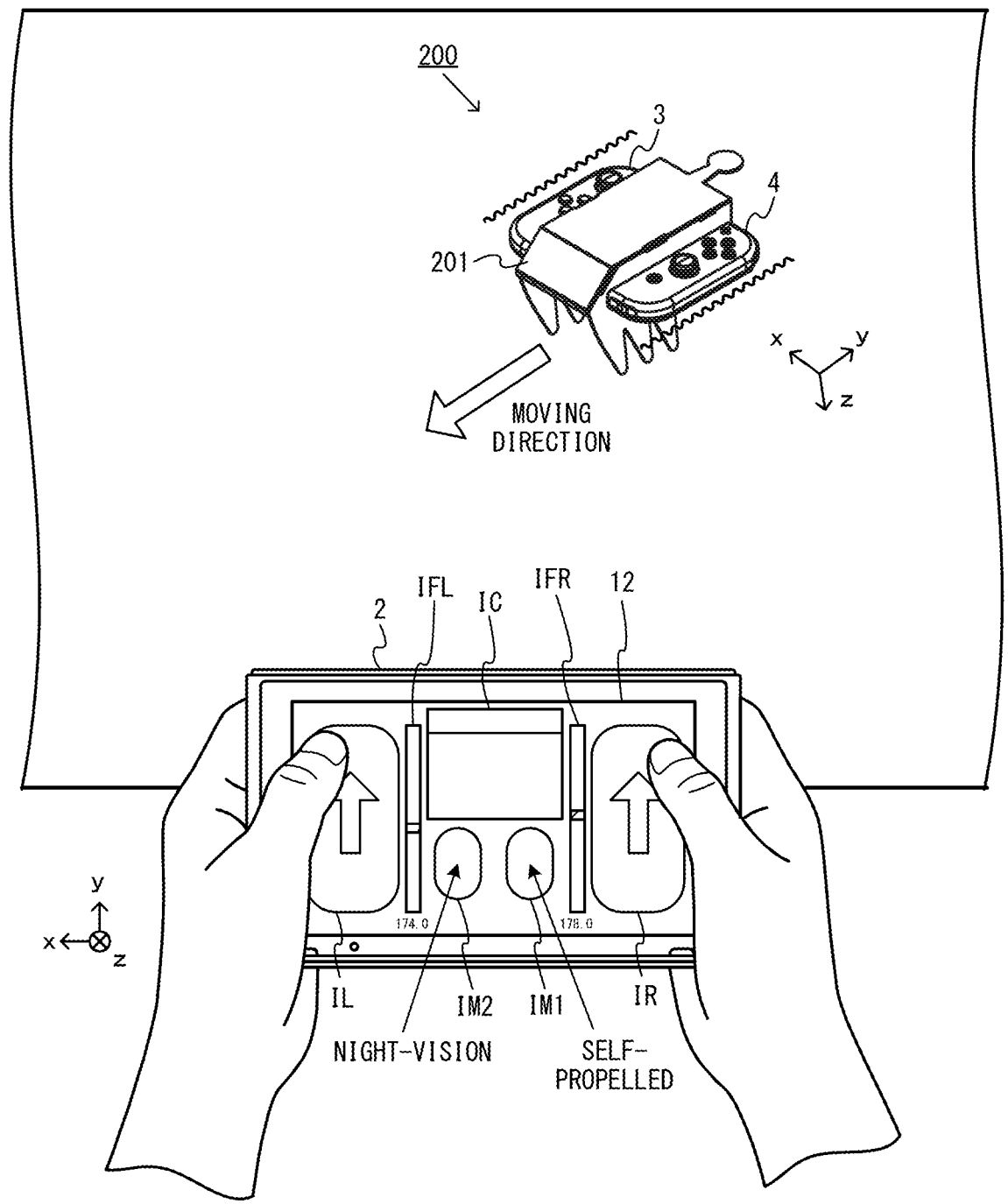
FIG. 8 is a diagram showing a non-limiting example of the state where a user operates the main body apparatus 2, thereby moving a moving device 200 in real space.

Next, with reference to FIG. 8, a description is given of a game where the moving device 200, which is an example of an apparatus for moving in real space, is moved. FIG. 8 is a diagram showing an example of the state where the user operates the main body apparatus 2, thereby moving the moving device 200 in real space. In the exemplary embodiment, the moving device 200 includes the left controller 3 and the right controller 4 detachably attached to the moving object 201. Then, the left controller 3 and the right controller 4 attached to the moving object 201 are vibrated, whereby the moving device 200 placed on a predetermined surface moves on the predetermined surface.

Here, although the details will be described later, each of the left controller 3 and the right controller 4 attached to the moving object 201 vibrates based on vibration data transmitted from the main body apparatus 2. Further, each of the left controller 3 and the right controller 4 transmits, to the main body apparatus 2, controller data including data (e.g., angular velocity data or acceleration data) allowing the calculation of the orientation of the controller, and data regarding a captured image captured by the right controller 4. Thus, the moving object 201 does not need to have an electrical structure such as an electronic circuit for detecting the orientation of the moving device 200, capturing a portion around the moving device 200, or transmitting and receiving vibration data or controller data. Thus, according to the exemplary embodiment, it is possible to simplify the configuration of the moving object 201, which forms the moving device 200, which is an example of the apparatus for moving in real space.

For example, in the exemplary embodiment, as shown in FIG. 8, the right controller 4 and the left controller 3 are attached to left and right side surfaces, respectively, of the moving object 201, thereby forming the moving device 200. Then, both the left controller 3 and the right controller 4 are vibrated in the state where the moving device 200 is placed on a predetermined surface in real space, whereby the moving device 200 moves along the predetermined surface in a predetermined moving direction (the negative y-axis directions of the left controller 3 and the right controller 4 attached to the moving object 201 in the exemplary embodiment). Further, only the controller (the right controller 4 in the exemplary embodiment) attached to the left side with respect to the moving direction is vibrated, whereby the moving device 200 moves by changing its moving direction to the right with respect to the moving direction. Further, only the controller (the left controller 3 in the exemplary embodiment) attached to the right side with respect to the moving direction is vibrated, whereby the moving device 200 moves by changing its moving direction to the left with respect to the moving direction. That is, a controller to be vibrated is switched, whereby it is also possible to change the moving direction of the moving device 200.

The user performs touch operations on operation button images (operation icons) displayed on the display 12 of the main body apparatus 2 and thereby can control the vibrations of the left controller 3 and the right controller 4 attached to the moving object 201. For example, on the display 12, a left vibration button image IL, a right vibration button image IR, a left vibration frequency adjustment bar image IFL, a right vibration frequency adjustment bar image IFR, a self-propelled mode selection button image IM1, a night-vision mode selection button image IM2, and the like are displayed. The user performs a touch operation on at least one of the operation button images displayed on the display 12 and thereby can impart vibrations corresponding to the operation button image subjected to the touch operation to the left controller 3 and/or the right controller 4.

For example, when the left vibration button image IL is subjected to a touch operation, vibration data for vibrating a controller (the right controller 4 in the exemplary embodiment) attached to the left side (i.e., the left side when the moving object 201 is directed in the same direction as the moving direction) when a front surface side (a front surface portion 201F side described later) of the moving object 201 is viewed from a back surface side (a back surface portion 201B side described later) of the moving object 201 is transmitted from the main body apparatus 2 to the controller, and the controller on the left side vibrates in accordance with the vibration data. Further, when the right vibration button image IR is subjected to a touch operation, vibration data for vibrating a controller (the left controller 3 in the exemplary embodiment) attached to the right side (i.e., the right side when the moving object 201 is directed in the same direction as the moving direction) when the front surface side (the front surface portion 201F side described later) of the moving object 201 is viewed from the back surface side (the back surface portion 201B side described later) of the moving object 201 is transmitted from the main body apparatus 2 to the controller, and the controller on the right side vibrates in accordance with the vibration data.

The user performs a drag operation on an operation handler image included in the left vibration frequency adjustment bar image IFL along the direction of the bar and thereby can change the frequency at which to vibrate the controller attached to the left side as viewed from the back surface side of the moving object 201. Further, the user performs a drag operation on an operation handler image included in the right vibration frequency adjustment bar image IFR along the direction of the bar and thereby can change the frequency at which to vibrate the controller attached to the right side as viewed from the back surface side of the moving object 201. Specifically, in accordance with the position of the operation handler image in the left vibration frequency adjustment bar image IFL or the right vibration frequency adjustment bar image IFR, the corresponding vibration frequency is set. The operation handler image is moved by a drag operation, whereby it is possible to change the vibration frequency. For example, the resonance frequency of the vibrator 107 or the vibrator 117 is 170 Hz, a touch operation is performed on the left vibration frequency adjustment bar image IFL or the right vibration frequency adjustment bar image IFR, whereby it is also possible to adjust the vibration frequency to the resonance frequency and vibrate the vibrator 107 or the vibrator 117 more strongly. The vibration frequency is thus adjusted, whereby it is possible to strengthen the vibration of the moving device 200, whereby it is possible to increase and decrease the propulsive force of the moving device 200.

When the self-propelled mode selection button image IM1 is subjected to a touch operation, the moving device 200 automatically runs in a self-propelled mode where the moving device 200 is controlled based on a captured image obtained by capturing a portion around the moving device 200. For example, the right controller 4 attached to the moving object 201 includes the infrared image capturing section 123 and the infrared light-emitting section 124. In the self-propelled mode, data regarding a captured image captured by the infrared image capturing section 123 is transmitted to the main body apparatus 2. Then, based on the transmitted data regarding the captured image, the main body apparatus 2 sets the direction in which the moving device 200 moves. Then, the main body apparatus 2 transmits vibration data based on the moving direction to the left controller 3 and the right controller 4, whereby the moving device 200 is self-propelled. It should be noted that the self-propelled mode will be described in detail later.

When the night-vision mode selection button image IM2 is subjected to a touch operation, the moving device 200 moves while capturing a portion around the moving device 200. For example, when the right controller 4 is attached to the moving object 201 as illustrated in FIG. 8, the image capturing direction of the infrared image capturing section 123 of the right controller 4 is set to the moving direction of the moving device 200. Further, as shown in FIG. 8, an image captured by the infrared image capturing section 123 is transmitted to the main body apparatus 2, whereby the image is displayed as a captured image IC on the display 12 of the main body apparatus 2. In a night-vision mode, the main body apparatus 2 transmits, to the right controller 4, instruction data for instructing the infrared image capturing section 123 to capture an image in the state where the infrared light-emitting section 124 emits infrared light. Then, when receiving, from the right controller 4, data indicating the image captured by the infrared image capturing section 123, the main body apparatus 2 displays the image as the captured image IC on the display 12 of the main body apparatus 2.

Here, each of the left controller 3 and the right controller 4 attached to the moving object 201 includes the inertial sensors (the acceleration sensor and the angular velocity sensor). Thus, it is possible to calculate the orientations and/or the motions of the left controller 3 and the right controller 4 (i.e., the orientation and/or the motion of the moving device 200) using the detection results of the inertial sensors. In the exemplary embodiment, in accordance with such an orientation and/or a motion of the moving device 200, the state where the moving device 200 moves is estimated. For example, when the moving device 200 falls down while moving, the orientations of the left controller 3 and/or the right controller 4 change in accordance with the falling down. Thus, based on the changes in the orientations, it is possible to detect the presence or absence of the falling down of the moving device 200. When the falling down of the moving device 200 is detected, the vibrations of the left controller 3 and the right controller 4 may be stopped, or an image for notifying the user of the falling down may be displayed on the display 12 of the main body apparatus 2, or a voice or a warning sound for notifying the user of the falling down may be output from the speakers 88 of the main body apparatus 2.

Figure 9:
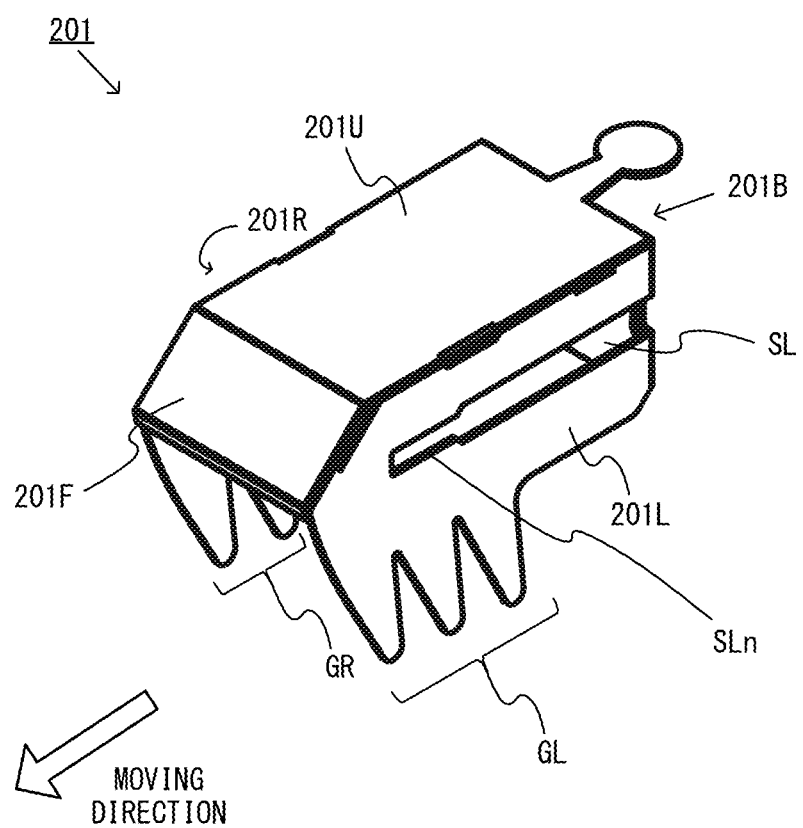
FIG. 9 is a perspective view showing a non-limiting example of the external appearance of a moving object 201.
Figure 10:
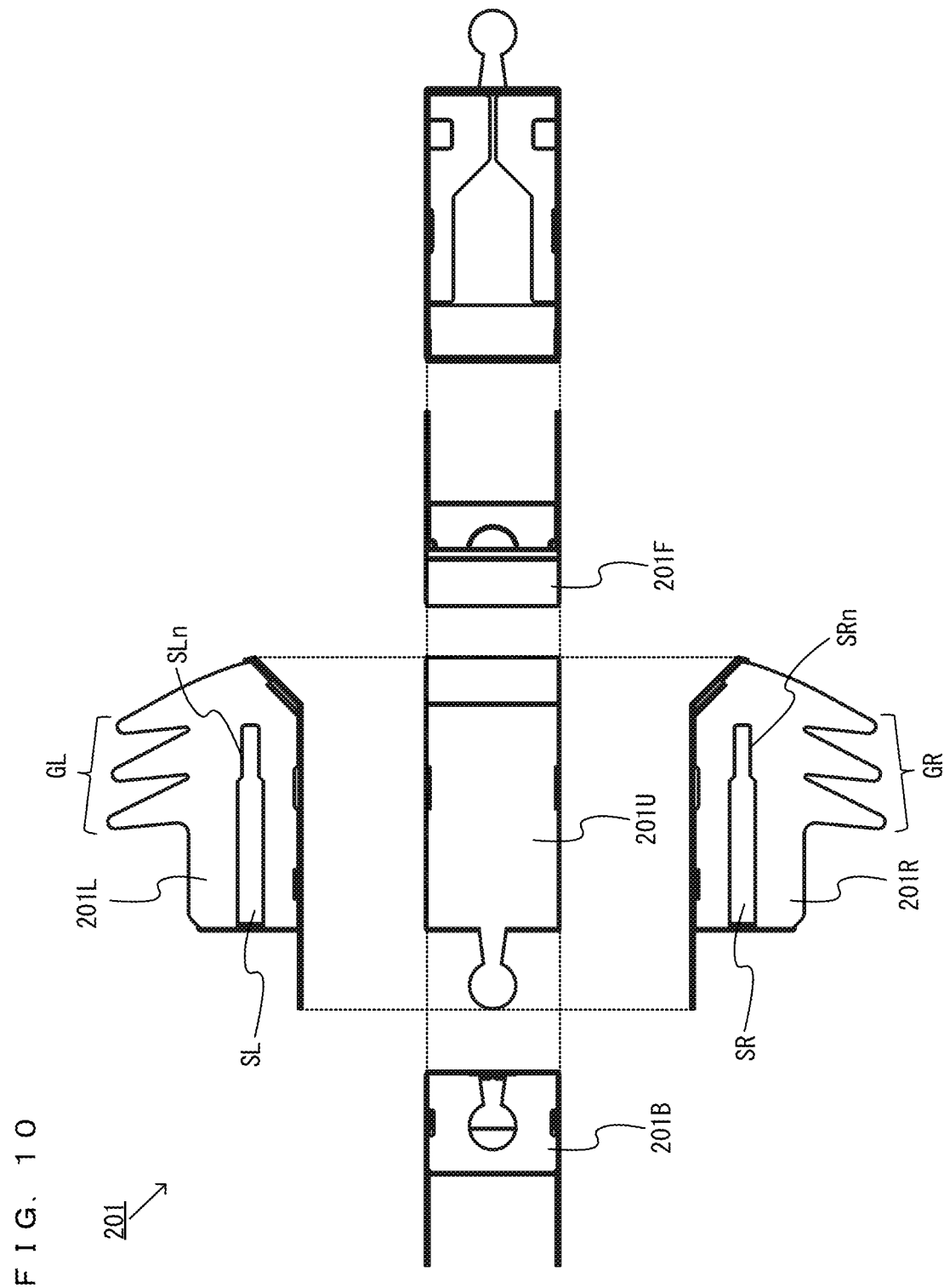
FIG. 10 is six orthogonal views showing a non-limiting example of the external appearance of the moving object 201.
Figure 11:
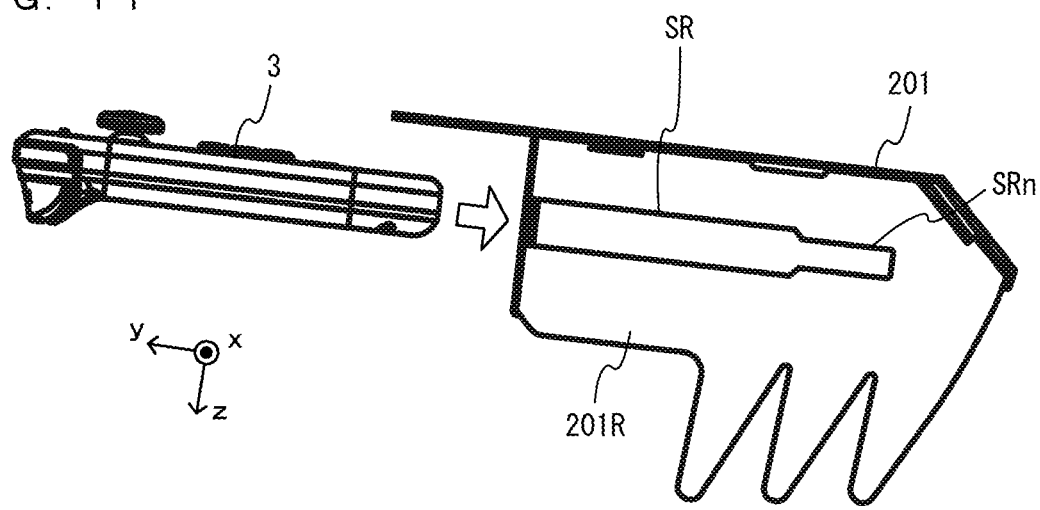
FIG. 11 is a diagram showing a non-limiting example of the state where the left controller 3 is attached to the moving object 201.
Figure 12:
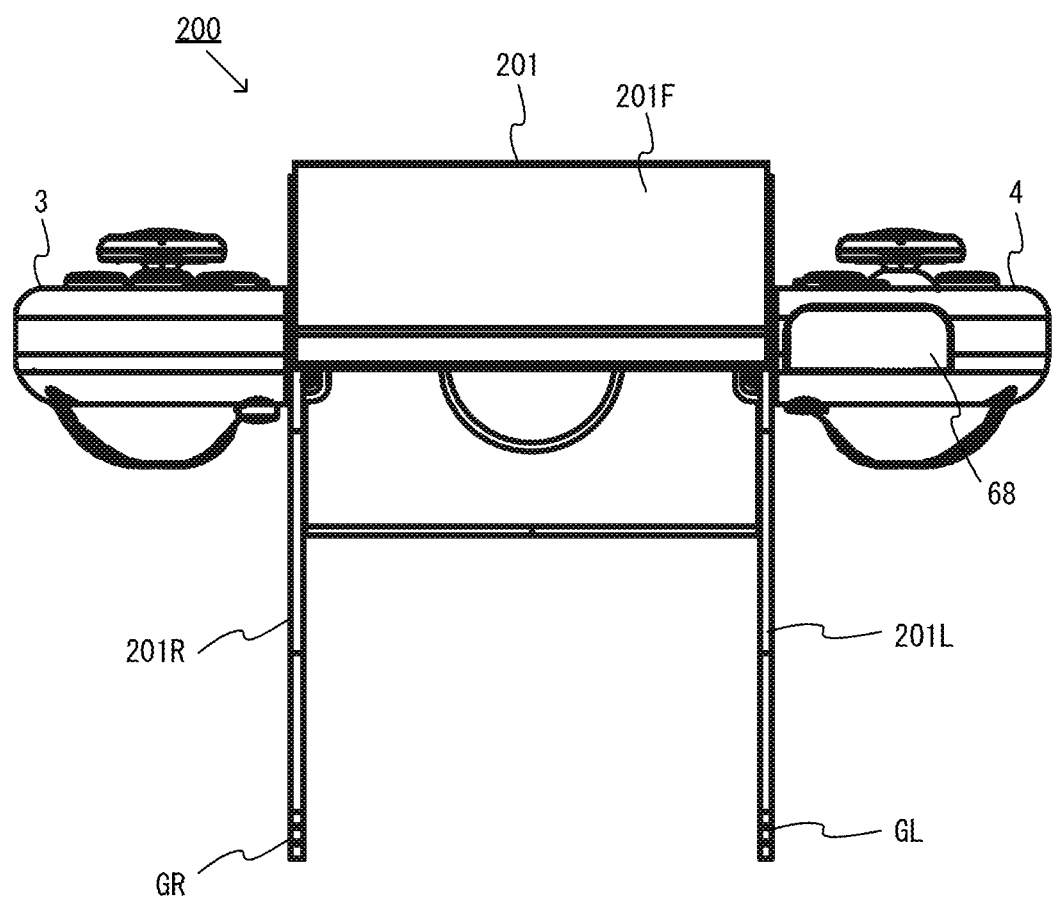
FIG. 12 is a front view of the left controller 3 and the right controller 4 as viewed in a negative y-axis direction, showing a non-limiting example of the external appearance of the moving device 200 to which the left controller 3 and the right controller 4 are attached.
Figure 13:
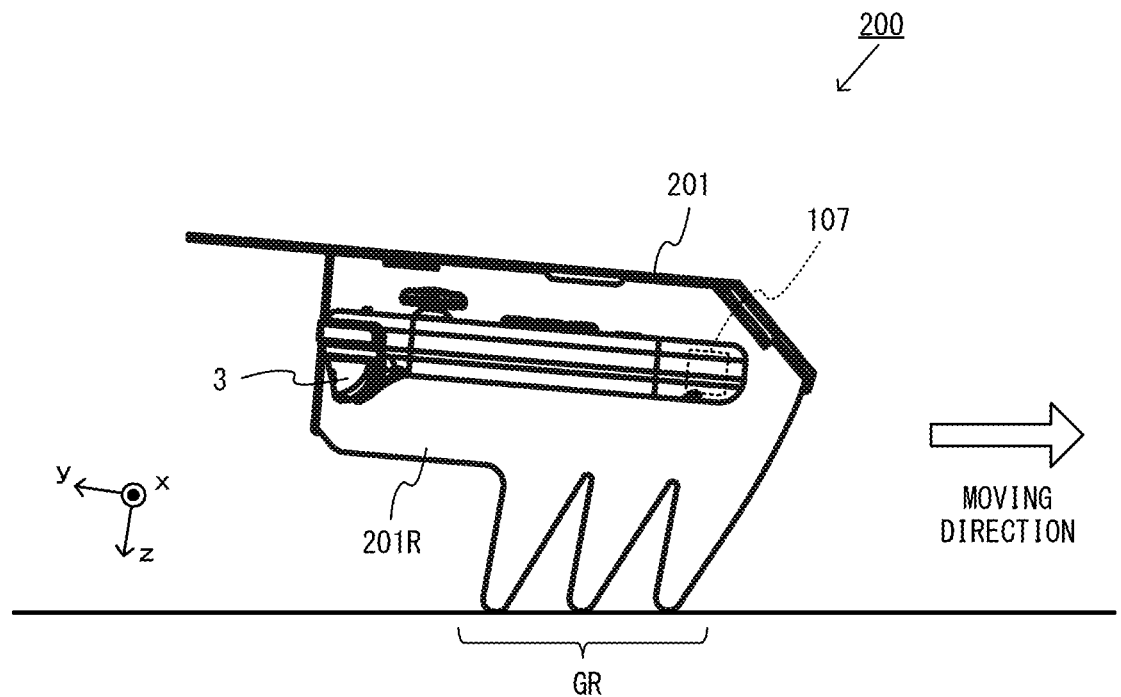
FIG. 13 is a right side view showing a non-limiting example of the external appearance of the moving device 200 to which the left controller 3 is attached.
Figure 14:
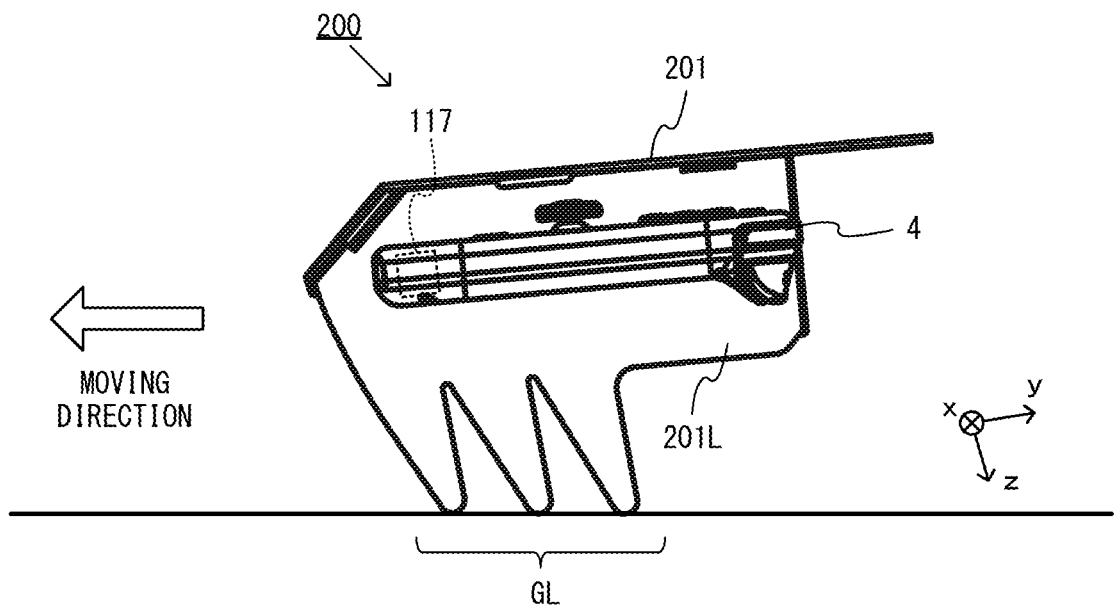
FIG. 14 is a left side view showing a non-limiting example of the external appearance of the moving device 200 to which the right controller 4 is attached.

Next, with reference to FIGS. 9 to 14, a description is given of the moving device 200, which is an example of the apparatus for moving in real space. It should be noted that FIG. 9 is a perspective view showing an example of the external appearance of the moving object 201. FIG. 10 is six orthogonal views showing an example of the external appearance of the moving object 201. FIG. 11 is a diagram showing an example of the state where the left controller 3 is attached to the moving object 201. FIG. 12 is a front view of the left controller 3 and the right controller 4 as viewed in a negative y-axis direction, showing an example of the external appearance of the moving device 200 to which the left controller 3 and the right controller 4 are attached. FIG. 13 is a right side view showing an example of the external appearance of the moving device 200 to which the left controller 3 is attached. FIG. 14 is a left side view showing an example of the external appearance of the moving device 200 to which the right controller 4 is attached.

In FIGS. 9 and 10, generally, the moving object 201 has a box-like shape including an upper surface portion 201U, a front surface portion 201F, a back surface portion 201B, a left side surface portion 201L, and a right side surface portion 201R. Then, at the lower ends of the left side surface portion 201L and the right side surface portion 201R, leg portions GL and GR, respectively, which are examples of grounded portions, are formed. The leg portions GL and GR are grounded on a predetermined surface, whereby it is possible to place the moving object 201 on the predetermined surface.

In the left side surface portion 201L, a fitting hole SL is formed, with which one of the controllers (the right controller 4 in the exemplary embodiment) is detachably engaged. The fitting hole SL is formed so as to be shaped to fit at least a part of the right controller 4. In the exemplary embodiment, the fitting hole SL is formed into a slit shape similar to the shape of the right rail member 19, which is provided in the main body apparatus 2. Then, the fitting hole SL is formed so as to fit at least a part of the slider 62 of the right controller 4. Specifically, the fitting hole SL is formed so as to be inserted into the slider 62 of the right controller 4 from the back surface portion 201B side of the moving object 201. The right controller 4 is slid along the longitudinal direction of the slit of the fitting hole SL in the state where only the slider 62 is inserted into the moving object 201, thereby attaching the right controller 4 to the fitting hole SL. Further, the slit width of the fitting hole SL is such that a part of the fitting hole SL on the front surface portion 201F side is formed to be narrow, and a narrow slit portion SLn is formed in the part of the fitting hole SL. When the slider 62 of the right controller 4 is inserted to the narrow slit portion SLn, there is no space between the slider 62 and the left side surface portion 201L, or there is predetermined interference between the slider 62 and the left side surface portion 201L. Then, the right controller 4 is fixed to the moving object 201 in a so-called transition fit or tight fit state.

In the right side surface portion 201R, a fitting hole SR is formed, with which one of the controllers (the left controller 3 in the exemplary embodiment) is detachably engaged. The fitting hole SR is formed so as to be in shaped to fit at least a part of the left controller 3. In the exemplary embodiment, the fitting hole SR is formed into a slit shape similar to the shape of the left rail member 15, which is provided in the main body apparatus 2. Then, the fitting hole SR is formed so as to fit at least a part of the slider 40 of the left controller 3. Specifically, the fitting hole SR is formed so as to be inserted into the slider 40 of the left controller 3 from the back surface portion 201B side of the moving object 201. The left controller 3 is slid along the longitudinal direction of the slit of the fitting hole SR in the state where only the slider 40 is inserted into the moving object 201, thereby attaching the left controller 3 to the fitting hole SR. Further, the slit width of the fitting hole SR is such that a part of the fitting hole SR on the front surface portion 201F side is formed to be narrow, and a narrow slit portion SRn is formed in the part of the fitting hole SR. When the slider 40 of the left controller 3 is inserted to the narrow slit portion SRn, there is no space between the slider 40 and the right side surface portion 201R, or there is predetermined interference between the slider 40 and the right side surface portion 201R. Then, the left controller 3 is fixed to the moving object 201 in a so-called transition fit or tight fit state.

Here, in the moving object 201, the fitting holes SL and SR for attaching the right controller 4 and the left controller 3 are formed on both left and right sides such that the fitting holes SL and SR are parallel to each other across the upper surface portion 201U having a predetermined width, and have the same height (i.e., are symmetrical with each other). Consequently, the left controller 3 and the right controller 4 are attached to the moving object 201 such that the xyz axis directions of the left controller 3 and the right controller 4 are parallel to each other, and the left controller 3 and the right controller 4 have the same height.

In a lower portion on the front surface portion 201F side of the left side surface portion 201L, a plurality of leg portions GL are formed. In the exemplary embodiment, three leg portions GL, which can be grounded in three places, are formed in the left side surface portion 201L. The leg portions GL are formed relatively on the front surface portion 201F side, and at least two leg portions GL (e.g., all the three leg portions GL) are formed on the front surface portion 201F side with respect to the center of the moving object 201. Further, the length of each of the leg portions GL is adjusted so that when the moving object 201 is placed in the state where the three leg portions GL are grounded on a predetermined surface, the entirety of the moving object 201 is inclined forward at a predetermined angle (has an angle of depression). Consequently, when the moving object 201 is placed, the left controller 3 and the right controller 4 attached to the moving object 201 are also arranged such that the left controller 3 and the right controller 4 are inclined forward at the predetermined angle.

Further, also in the right side surface portion 201R, leg portions GR similar to the plurality of leg portions GL formed in the left side surface portion 201L are formed symmetrically to the leg portions GL. That is, also in the right side surface portion 201R, a plurality of (e.g., three) leg portions GR, which can be grounded in a plurality of places (e.g., three places), are formed. The leg portions GR are formed relatively on the front surface portion 201F side, and at least two leg portions GR (e.g., all the three leg portions GR) are formed on the front surface portion 201F side with respect to the center of the moving object 201. Further, similarly to the leg portions GL, the length of each of the leg portions GR is adjusted so that when the moving object 201 is placed in the state where the three leg portions GR are grounded on a predetermined surface, the entirety of the moving object 201 is inclined forward at a predetermined angle.

It should be noted that as an example of a part to be grounded when the moving device 200 is placed on a surface in real space, the three leg portions GL and the three leg portions GR that can be grounded in three places are used. Alternatively, another grounded portion may be used. For example, a grounded portion of at least a part of the moving device 200 may be formed of a wheel for forming a tread that rolls on a predetermined surface in real space, a tire attached to the wheel, a cylinder (a roller), or the like. Further, a grounded portion of at least a part of the moving device 200 may be formed of a plate-like member for sliding a predetermined surface in real space. Further, a grounded portion of at least a part of the moving device 200 may be formed by grounding extremity portions of a plurality of fibers or wires implanted in a lower portion of the moving device 200. Further, a grounded portion of at least a part of the moving device 200 may be formed by providing, in a lower portion of the moving device 200, a member capable of being bent in accordance with a vibration imparted to the member, and by grounding the lower end of the member.

In the exemplary embodiment, the left controller 3 and the right controller 4 are attached to the moving object 201 such that the negative y-axis directions of the left controller 3 and the right controller 4 are on the front surface portion 201F side of the moving object 201 in the state where the main surfaces (the surfaces on which the analog sticks 32 and 52 are provided) of the left controller 3 and the right controller 4 are directed upward. For example, as shown in FIGS. 11 and 12, when the left controller 3 is attached to the moving object 201, the left controller 3 is inserted into the fitting hole SR of the right side surface portion 201R from the lower side surface (the surface formed further in the negative y-axis direction) side in the state where the main surface of the left controller 3 is directed upward. At this time, the left controller 3 is slid in the slit direction of the fitting hole SR (the direction of an arrow in FIG. 11) from the back surface portion 201B side of the fitting hole SR in the state where only a part corresponding to the slider 40 of the left controller 3 is inserted into the moving object 201. In this slide operation, the left controller 3 is slid in the negative y-axis direction. When the left controller 3 slides to the front surface portion 201F side by the slide operation, the slider 40 of the left controller 3 fits the narrow slit portion SRn. By this fitting with the narrow slit portion SRn, the slider 40 of the left controller 3 is fixed to the right side surface portion 201R in the state where there is predetermined interference between the slider 40 and the narrow slit portion SRn. In this state, the left controller 3 is attached along the slit direction of the fitting hole SR. It should be noted that although the right controller 4 is attached along the slit direction of the fitting hole SR, the right controller 4 is attached by a slide operation similar to that of the left controller 3. Thus, the attachment of the right controller 4 is not described in detail here. As shown in FIG. 12, the left controller 3 and the right controller 4 are attached to the moving object 201 such that the xyz axis directions of the left controller 3 and the right controller 4 are parallel to each other, and the left controller 3 and the right controller 4 have the same height.

As shown in FIG. 13, when the left controller 3 is attached to the moving object 201, the negative y-axis direction of the left controller 3 is the front surface direction of the moving object 201 (i.e., the moving direction). Then, as described above, the leg portions GL and GR are grounded such that the entirety of the moving object 201 is inclined forward at a predetermined angle. Thus, the left controller 3 is attached in the state where the negative y-axis direction of the left controller 3 is at an angle of depression. Here, the vibrator 107, which is provided in the left controller 3, is provided near a lower end portion within the left controller 3 (near the lower side surface formed further in the negative y-axis direction). Thus, when the left controller 3 is attached to the moving object 201, the vibrator 107, which is provided in the left controller 3, is placed on the front surface side of the moving object 201 (further in the moving direction). Further, the narrow slit portion SLn, which fits the left controller 3 in the state where there is predetermined interference, is formed on the front surface side of the moving object 201. Thus, a portion near the lower end portion of the left controller 3 fits the narrow slit portion SRn. That is, the left controller 3 is fixed to the moving object 201 in the state where there is predetermined interference near a portion where the vibrator 107, which is the driving source (the vibration source) of the moving device 200, is placed. Thus, the vibration of the vibrator 107 is transmitted to the moving object 201 more certainly. Further, the leg portions GR, which are places where the moving device 200 is grounded, are also formed on the front surface side of the moving object 201. Thus, grounded portions when the moving device 200 moves are disposed at positions close to the vibrator 107, which is the driving source (the vibration source). Thus, it is also possible to impart a stronger vibration to the grounded portions (the leg portions GR). As described above, in the exemplary embodiment, the driving source (the vibrator 107) is placed on the front surface side, which is the moving direction of the moving device 200, and a fitting portion (the narrow slit portion SRn) for fixing the driving source and the grounded portions (the leg portions GR) when the moving device 200 moves are also provided on the same front surface side. Thus, it is easy to impart a propulsive force for moving the moving device 200 in the moving direction, and it is possible to efficiently impart to the moving object 201 a vibration for moving in the moving direction.

Further, as shown in FIG. 14, when the right controller 4 is attached to the moving object 201, the negative y-axis direction of the right controller 4 is the front surface direction of the moving object 201 (i.e., the moving direction). Then, as described above, the leg portions GL and GR are grounded such that the entirety of the moving object 201 is inclined forward at a predetermined angle. Thus, the right controller 4 is attached in the state where the negative y-axis direction of the right controller 4 is at an angle of depression. Here, the vibrator 117, which is provided in the right controller 4, is provided near a lower end portion within the right controller 4 (near the lower side surface formed further in the negative y-axis direction). Thus, when the right controller 4 is attached to the moving object 201, the vibrator 117, which is provided in the right controller 4, is placed on the front surface side of the moving object 201 (further in the moving direction). Further, the narrow slit portion SLn, which fits the right controller 4 in the state where there is predetermined interference, is formed on the front surface side of the moving object 201. Thus, a portion near the lower end portion of the right controller 4 fits the narrow slit portion SLn. That is, the right controller 4 is fixed to the moving object 201 in the state where there is predetermined interference near a portion where the vibrator 117, which is the driving source (the vibration source) of the moving device 20 is placed. Thus, the vibration of the vibrator 117 is transmitted to the moving object 201 more certainly. Further, the leg portions GL, which are places where the moving device 200 is grounded, are also formed on the front surface side of the moving object 201. Thus, grounded portions when the moving device 200 moves are disposed at positions close to the vibrator 117, which is the driving source (the vibration source). Thus, it is also possible to impart a stronger vibration to the grounded portions (the leg portions GL). As described above, in the exemplary embodiment, the driving source (the vibrator 117) is placed on the front surface side, which is the moving direction of the moving device 200, and a fitting portion (the narrow slit portion SLn) for fixing the driving source and the grounded portions (the leg portions GL) when the moving device 200 moves are also provided on the same front surface side. Thus, it is easy to impart a propulsive force for moving the moving device 200 in the moving direction, and it is possible to efficiently impart to the moving object 201 a vibration for moving in the moving direction.

Further, as is clear from FIGS. 9 to 14, the leg portions GL are disposed as grounded portions in a lower area of the vibrator 117, and the leg portions GR are disposed as grounded portions in a lower area of the vibrator 107. That is, the leg portions GL are disposed relatively distant from the vibrator 107 with respect to the leg portions GR. The leg portions GR are disposed relatively distant from the vibrator 117 with respect to the leg portions GL. Thus, even when the vibrators 107 and 117 are vibrated with the same amplitude and the same frequency, the leg portions GL vibrate more strongly by a vibration obtained from the vibrator 117 than by a vibration obtained from the vibrator 107, and the leg portions GR vibrate more strongly by a vibration obtained from the vibrator 107 than by a vibration obtained from the vibrator 117. Further, when only the vibrator 107 vibrates, the leg portions GR vibrate by a vibration greater than that of the leg portions GL, and in the moving device 200, the propulsive force on the right side as viewed from the back surface side is greater than the propulsive force on the left side. Thus, the moving device 200 moves revolving to the left. On the other hand, when only the vibrator 117 vibrates, the leg portions GL vibrate by a vibration greater than that of the leg portions GR, and in the moving device 200, the propulsive force on the left side as viewed from the back surface side is greater than the propulsive force on the right side. Thus, the moving device 200 moves revolving to the right.

It should be noted that a method for attaching the left controller 3 and the right controller 4 to the moving object 201 is not limited to the above example, and the left controller 3 and the right controller 4 may be attached by another method. As a first example, in the state where the main surfaces (the surfaces on which the analog sticks 32 and 52 are provided) of the left controller 3 and the right controller 4 are directed downward or directed sideways, the left controller 3 and the right controller 4 may be attached to the moving object 201. As a second example, in the state where positive y-axis directions of the left controller 3 and the right controller 4 are the front surface direction of the moving object 201, the left controller 3 and the right controller 4 may be attached to the moving object 201. As a third example, the left controller 3 may be attached to the left side surface portion 201L of the moving object 201, and the right controller 4 may be attached to the right side surface portion 201R of the moving object 201. Alternatively, the left controller 3 and the right controller 4 may be attached to the moving object 201 by combining at least two of the first to third examples.

Figure 15:
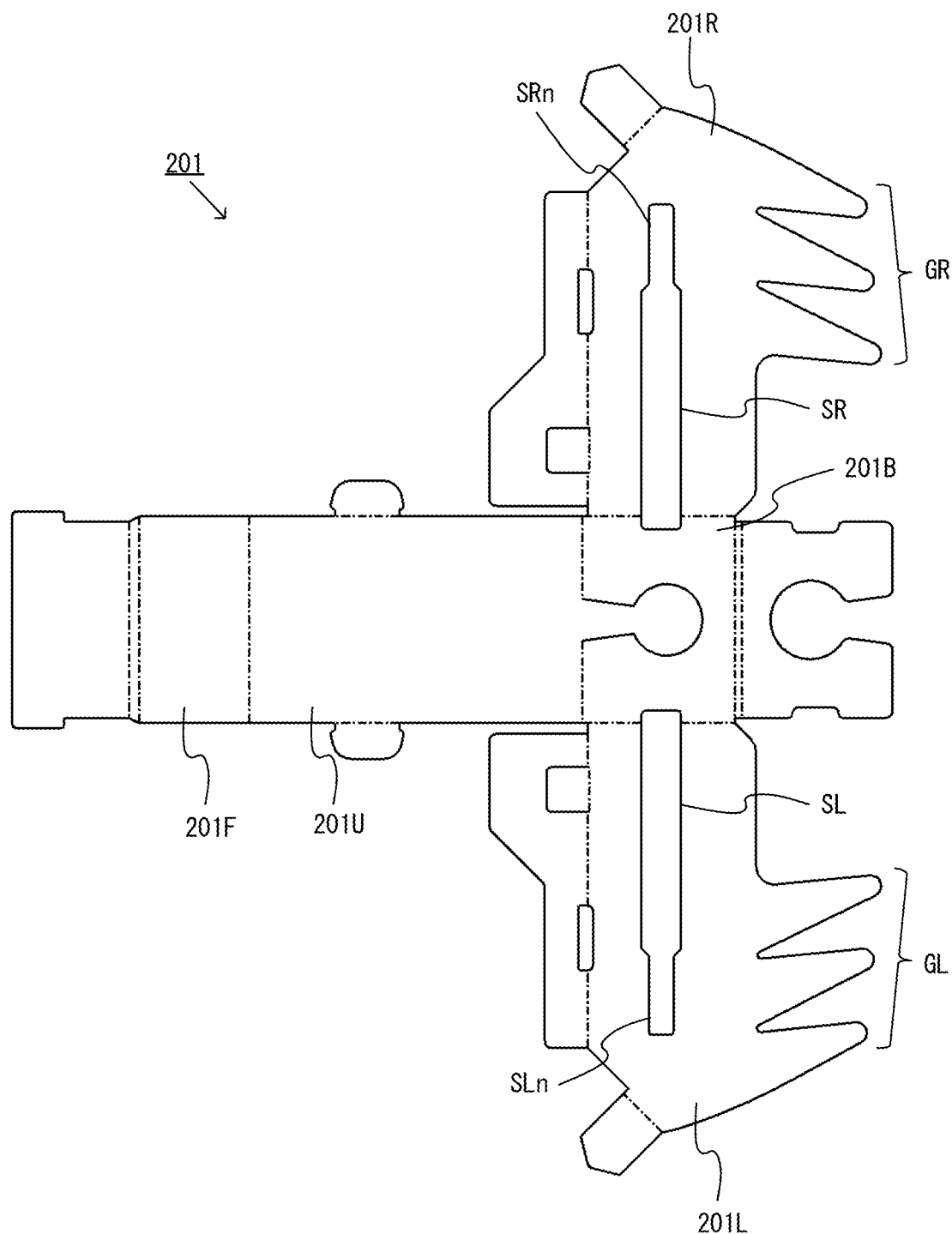
FIG. 15 is a diagram showing a non-limiting example of a cardboard member for assembling the moving object 201.

Next, with reference to FIG. 15, a method for assembling the moving object 201 is described. It should be noted that FIG. 15 is a diagram showing an example of a cardboard member for assembling the moving object 201. It should be noted that in FIG. 15, a solid line indicates a line for cutting off the cardboard member, and a dashed-dotted line indicates a line for mountain-folding the cardboard member.

In FIG. 15, components of the moving object 201 are formed by folding the cardboard member. It should be noted that the components shown in FIG. 15 may be parts of the components of the moving object 201, and components that are not shown in FIG. 15 may also be assembled by folding the cardboard member. Further, in the exemplary embodiment, the cardboard member may be a single plate member having a stack structure or a plurality of plate members bonded together. For example, the cardboard member may be a so-called corrugated cardboard member, which is formed by bonding a plate-like paper sheet to one surface or both of two surfaces of a corrugated plate-like paper sheet.

As shown in FIG. 15, the moving object 201 is formed by folding a single cardboard member into a three-dimensional shape. In the cardboard member for forming the moving object 201, holes for forming the upper surface portion 201U, the front surface portion 201F, the back surface portion 201B, the left side surface portion 201L, the right side surface portion 201R, and the fitting holes SL and SR, pass-through holes and pass-through notches to which formed components are fixed, pass-through pieces for passing through the pass-through holes and the pass-through notches, and the like are formed. Then, a plate member in which the components are formed is mountain-folded in a dashed-dotted line portion, and the pass-through pieces are caused to pass through the pass-through holes and the pass-through notches, thereby assembling the moving object 201. Specifically, the plate member is formed of a cardboard member, and the cardboard member is folded into a three-dimensional shape for forming the moving object 201, thereby assembling the moving object 201.

For folding the cardboard member to form a three-dimensional shape (a polyhedron shape), the surfaces may be bonded together by any method. For example, the sides of the surfaces may be bonded together by an adhesive tape. An insertion tab may be formed on one of the sides, and an insertion hole may be formed in the other side, so that the insertion tab may be inserted into the insertion hole. The sides of the surfaces may be bonded together by an adhesive agent. In the above-described embodiment, the components of the moving object 201 are each formed of a cardboard member. Alternatively, at least a part of these components may be a thin paper sheet or another type of plate member. For example, at least a part of these components may be assembled by folding a resinous, wooden or metallic thin or thick plate member or may be strip-like fiber members. A part of these components may be combined with a component of a different material. For example, a hole through which another member passes and a grounded portion for moving by being grounded can be scraped or worn by the movement of the member or the movement of the moving object 201 itself. Thus, a ring member or a sheet member made of resin or the like can be used in this portion. At least parts of the components may be provided in advance as a polyhedron component. Further, at least parts of the components may be formed as a polyhedron component in advance.

Figure 16:
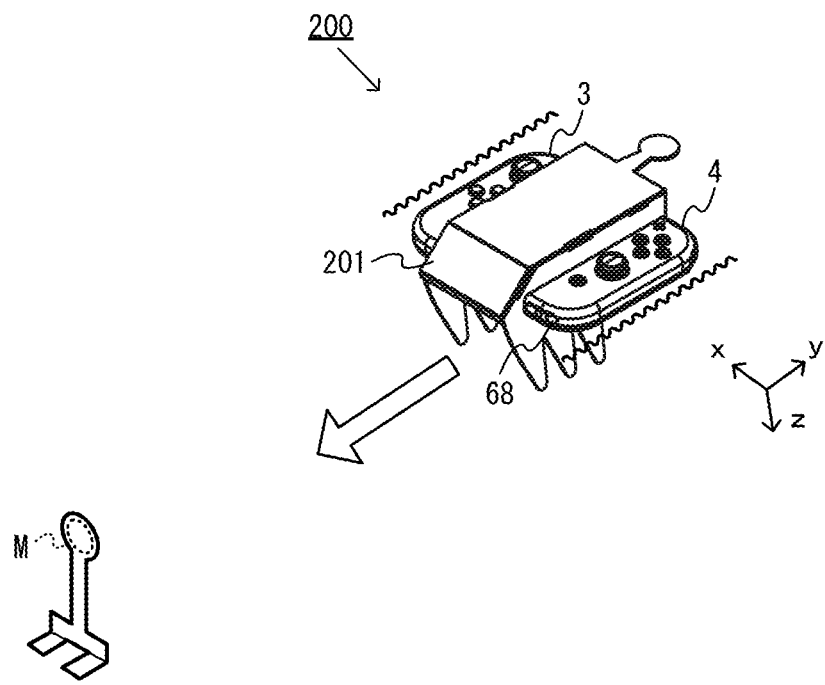
FIG. 16 is a diagram showing a non-limiting example of the state where the moving device 200 moves using a self-propelled mode.

Next, with reference to FIG. 16, the self-propelled mode is described. It should be noted that FIG. 16 is a diagram showing an example of the state where the moving device 200 moves using the self-propelled mode.

In FIG. 16, when the moving device 200 moves in the self-propelled mode, an image captured by the infrared image capturing section 123, which is provided in the right controller 4, is used. For example, on the lower side surface of the right controller 4, the window portion 68 is provided, through which the infrared image capturing section 123 captures the surroundings. When the right controller 4 is attached to the moving object 201, the window portion 68 is placed further in the moving direction of the moving device 200. Thus, the image capturing direction of the infrared image capturing section 123 for capturing an image through the window portion 68 is the moving direction of the moving device 200.

When the moving device 200 is moved in the self-propelled mode, an image capturing target member is placed on the same movement surface on which the moving device 200 moves. For example, at least a part of the image capturing target member includes a recognition portion M, which is composed of a material distinguishable from another portion in a captured image captured by the infrared image capturing section 123. For example, the recognition portion M may be composed of a material having retroreflective properties. Consequently, the recognition portion M reflects more infrared light. Thus, it is easy to recognize the recognition portion M, i.e., the image capturing position of the image capturing target member, in the captured image captured by the infrared image capturing section 123. It should be noted that the image capturing target member may be placed at rest on the movement surface, or may be stuck to another moving device (e.g., another moving device 200).

In the self-propelled mode, data regarding a captured image captured by the infrared image capturing section 123 is transmitted to the main body apparatus 2. Then, based on the transmitted data regarding the captured image, the main body apparatus 2 determines, using a predetermined image recognition process, whether or not the image capturing target member (the recognition portion M) is captured in the captured image. Further, when the image capturing target member (the recognition portion M) is captured in the captured image, the main body apparatus 2 calculates an image capturing target image capturing direction in which the image capturing target member is captured, and based on the image capturing target image capturing direction, sets the direction in which the moving device 200 should move. As an example, the main body apparatus 2 adjusts the moving direction of the moving device 200 by controlling the vibrations of the vibrators 107 and 117 so that the closest image capturing target member (the recognition portion M) captured in the captured image captured by the infrared image capturing section 123 is captured at the center of the captured image. For example, when the image capturing target member (the recognition portion M) is captured in a left side area of the captured image, the main body apparatus 2 vibrates only the vibrator 107 of the left controller 3 so as to revolve the moving direction of the moving device 200 to the left. Then, when the image capturing position of the image capturing target member moves to a center area of the captured image, the main body apparatus 2 vibrates both the vibrator 107 of the left controller 3 and the vibrator 117 of the right controller 4, thereby moving the moving device 200 toward the image capturing target member. On the other hand, when the image capturing target member (the recognition portion M) is captured in a right side area of the captured image, the main body apparatus 2 vibrates only the vibrator 117 of the right controller 4 so as to revolve the moving direction of the moving device 200 to the right. Then, when the image capturing position of the image capturing target member moves to the center area of the captured image, the main body apparatus 2 vibrates both the vibrator 107 of the left controller 3 and the vibrator 117 of the right controller 4, thereby moving the moving device 200 toward the image capturing target member.

It should be noted that as described above, the recognition portion M may be stuck to another moving device. For example, the recognition portion M is stuck to a back portion of the other moving device, whereby it is possible to control the moving device 200 to be self-propelled by automatically following the other moving device that is moving. Further, in the above description, control for moving the moving device 200 toward the image capturing target member (the recognition portion M) is used. Alternatively, another type of control may be performed in the self-propelled mode. For example, when the image capturing target member (the recognition portion M) is not captured in a captured image captured by the infrared image capturing section 123, the main body apparatus 2 may perform control so that a predetermined operation for searching for the image capturing target member (e.g., an operation for revolving the moving device 200 to the right or the left) may be performed, or the main body apparatus 2 may perform control to stop the movement at this position. Yet alternatively, the main body apparatus 2 may move the moving device 200 so as to avoid collision with the image capturing target member. In this case, the main body apparatus 2 may control the moving direction of the moving device 200 so that the image capturing position of the image capturing target member is a left end portion or a right end portion of the captured image. Alternatively, the main body apparatus 2 may control the moving direction of the moving device 200 so that the image capturing target member is not captured in the captured image.

Further, data regarding a captured image captured by the infrared image capturing section 123 transmitted from the right controller 4 to the main body apparatus 2 may be data indicating the captured image itself, or may be data indicating information obtained from the captured image. Based on the above information, the main body apparatus 2 estimates the image capturing position of the image capturing target member (the recognition portion M) and controls the moving direction of the moving device 200. As an example, in the right controller 4, a cluster of high-luminance pixels may be detected from a captured image captured by the infrared image capturing section 123, and data indicating the position and the size of the cluster in the captured image may be transmitted to the main body apparatus 2. As another example, in the right controller 4, a captured image captured by the infrared image capturing section 123 may be divided into a plurality of blocks, and data indicating the average luminance and the position of the center of gravity of each block may be transmitted to the main body apparatus 2.

Figure 17:
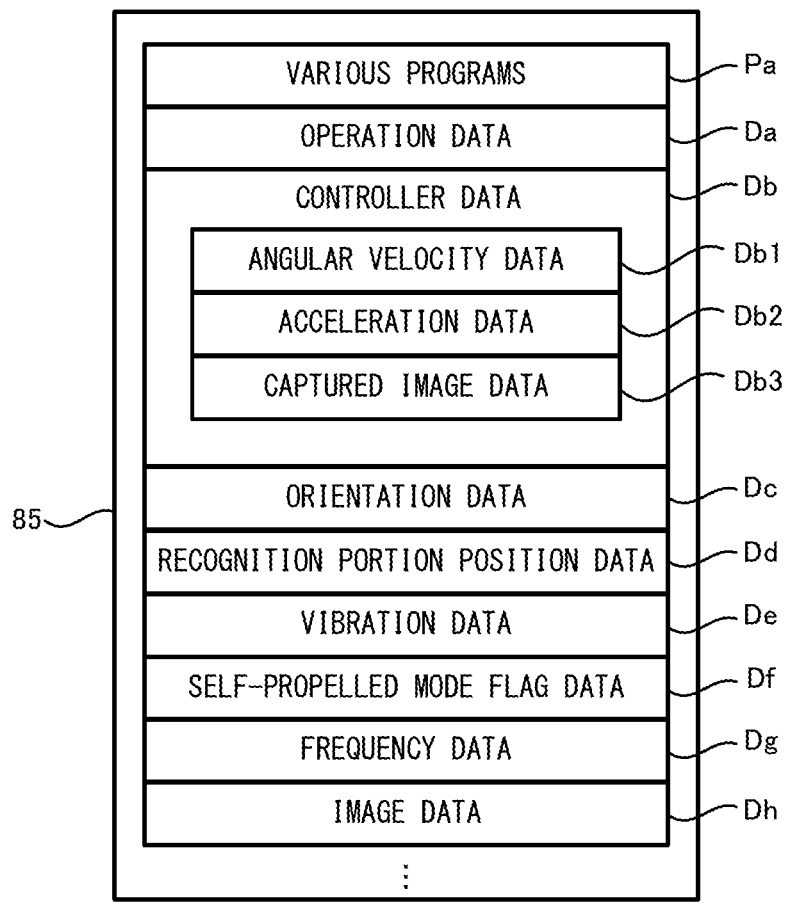
FIG. 17 is a diagram showing a non-limiting example of a data area set in a DRAM 85 of the main body apparatus 2.
Figure 19:
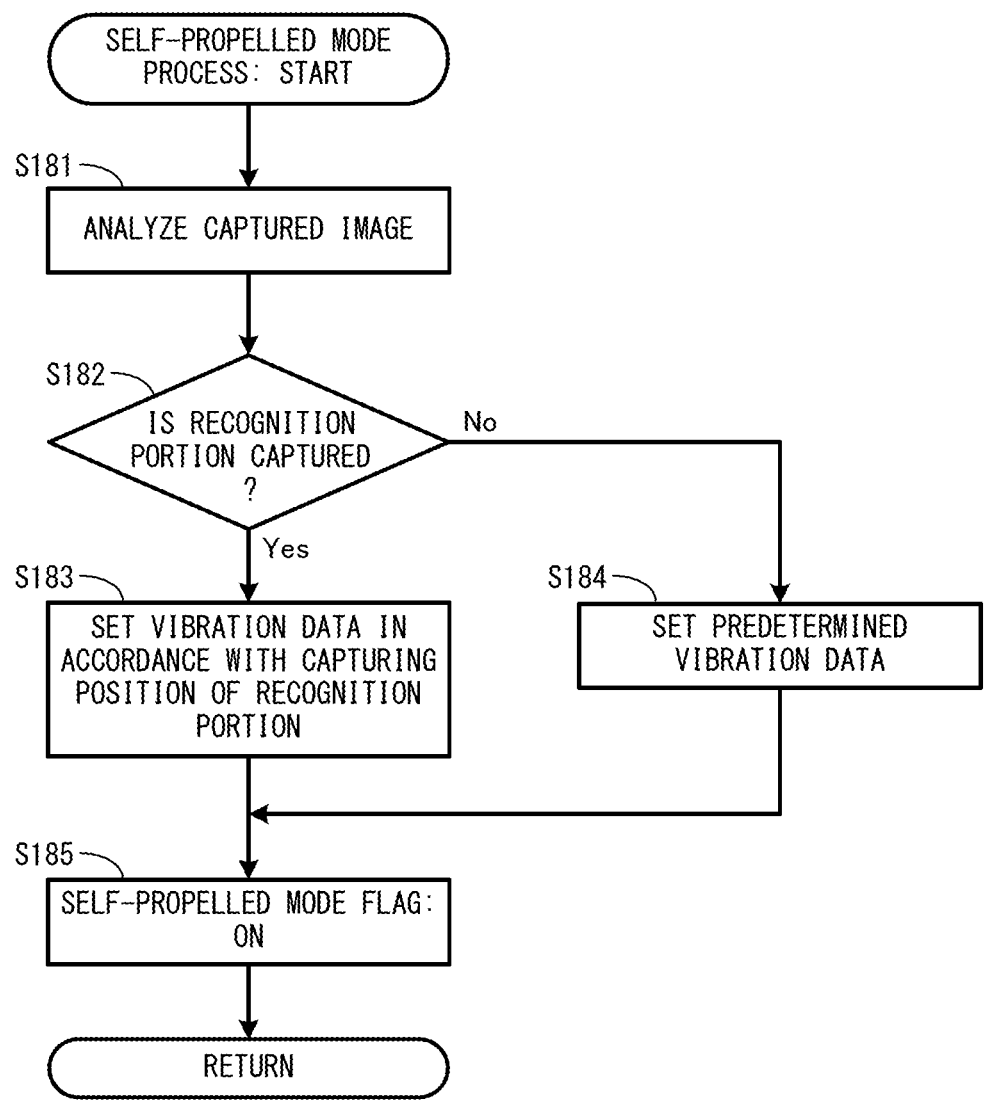
FIG. 19 is a subroutine showing a non-limiting example of a self-propelled mode process in step S165 in FIG. 18.

Next, with reference to FIGS. 17 to 19, a description is given of an example of specific processing executed by the main body apparatus 2 according to the exemplary embodiment. FIG. 17 is a diagram showing an example of a data area set in the DRAM 85 of the main body apparatus 2 according to the exemplary embodiment. It should be noted that in the DRAM 85, in addition to data shown in FIG. 17, data used for other processes is also stored, but is not described in detail here.

In a program storage area of the DRAM 85, various programs Pa, which are executed by the main body apparatus 2, are stored. In the exemplary embodiment, as the various programs Pa, a communication program for wirelessly communicating with the left controller 3 and the right controller 4, an application program for performing information processing (e.g., game processing) based on data acquired from the left controller 3 and/or the right controller 4, a vibration control program for vibrating the left controller 3 and/or the right controller 4, and the like are stored. It should be noted that the various programs Pa may be stored in advance in the flash memory 84, or may be acquired from a storage medium attachable to and detachable from the game system 1 (e.g., a storage medium attached to the slot 23) and stored in the DRAM 85, or may be acquired from another apparatus via a network such as the Internet and stored in the DRAM 85. The processor 81 executes the various programs Pa stored in the DRAM 85.

Further, in a data storage area of the DRAM 85, various data used for processes such as a communication process, information processing, and the like executed by the main body apparatus 2 is stored. In the exemplary embodiment, in the DRAM 85, operation data Da, controller data Db, orientation data Dc, recognition portion position data Dd, vibration data De, self-propelled mode flag data Df, frequency data Dg, image data Dh, and the like are stored.

The operation data Da is data indicating the content of an operation performed using the main body apparatus 2. For example, the main body apparatus 2 includes the touch panel 13 on the screen of the display 12, and data indicating the presence or absence of a touch operation on the touch panel 13 and the touch position is appropriately stored in the operation data Da. In the exemplary embodiment, operation data is output in a predetermined cycle from an operation device (e.g., the touch panel 13) included in the main body apparatus 2, and the operation data Da is appropriately updated using the output operation data. It should be noted that the update cycle of the operation data Dc may be such that the operation data Da is updated every frame, which is the cycle of the processing described later executed by the game system 1, or is updated every cycle in which the above operation data is output.

The controller data Db is data appropriately acquired from each of the left controller 3 and/or the right controller 4. As described above, controller data transmitted from each of the left controller 3 and/or the right controller 4 includes information regarding an input (specifically, information regarding an operation or the detection result of the sensor) from each of the input sections (specifically, each button, each analog stick, and each sensor), and information based on the image capturing result of a captured image captured by the infrared image capturing section 123. In the exemplary embodiment, controller data is transmitted in a predetermined cycle from each of the left controller 3 and/or the right controller 4 through wireless communication, and the controller data Db is appropriately updated using the received controller data. It should be noted that the update cycle of the controller data Db may be such that the controller data Db is updated every frame, which is the cycle of the processing described later executed by the game system 1, or is updated every cycle in which the above controller data is transmitted through the wireless communication. Specifically, the controller data Db includes angular velocity data Db1, acceleration data Db2, captured image data Db3, and the like. The angular velocity data Db1 is data indicating information regarding angular velocities generated in the left controller 3 and detected by the angular velocity sensor 105 of the left controller 3, and information regarding angular velocities generated in the right controller 4 and detected by the angular velocity sensor 115 of the right controller 4. For example, the angular velocity data Db1 includes data indicating angular velocities generated about the xyz axes in each of the left controller 3 and the right controller 4. The acceleration data Db2 is data indicating information regarding accelerations generated in the left controller 3 and detected by the acceleration sensor 104 of the left controller 3, and information regarding accelerations generated in the right controller 4 and detected by the acceleration sensor 114 of the right controller 4. For example, the acceleration data Db2 includes data indicating accelerations generated in the xyz axis directions in each of the left controller 3 and the right controller 4. The captured image data Db3 is data regarding a captured image captured by the infrared image capturing section 123, and may be data indicating the captured image itself or may be data indicating information obtained from the captured image.

The orientation data Dc is data indicating each of the orientations of the left controller 3 and the right controller 4 with respect to the direction of a gravitational acceleration in real space. For example, the orientation data Dc includes data indicating the direction of a gravitational acceleration acting on each of the left controller 3 and the right controller 4, data indicating xyz axis directions relative to the direction of the gravitational acceleration, and the like.

The recognition portion position data Dd is data indicating the image capturing position of the recognition portion M captured in a captured image captured by the infrared image capturing section 123.

The vibration data De is data indicating vibrations for vibrating the left controller 3 and the right controller 4.

The self-propelled mode flag data Df is data indicating a self-propelled mode flag set to on when the self-propelled mode is set.

The frequency data Dg is data indicating the frequency at which to vibrate each of the left controller 3 and the right controller 4.

The image data Dh is data for displaying images (e.g., operation button images and the like) on a display device (e.g., the display 12 of the main body apparatus 2) when a game is performed.

Next, a description is given of a detailed example of a control process (e.g., game processing for controlling the movement of the moving device 200) according to the exemplary embodiment. FIG. 18 is a flow chart showing an example of the control process executed by the main body apparatus 2. FIG. 19 is a subroutine showing an example of a self-propelled mode process in step S165 in FIG. 18. In the exemplary embodiment, a series of processes shown in FIGS. 18 and 19 is performed by the processor 81 executing the communication program and a predetermined application program (a communication program) included in the various programs Pa. Further, the control process shown in FIG. 18 is started at any timing.

It should be noted that the processes of all of the steps in the flow charts shown in FIGS. 18 and 19 are merely illustrative. Thus, the processing order of the steps may be changed, or another process may be performed in addition to (or instead of) the processes of all of the steps, so long as similar results are obtained. Further, in the exemplary embodiment, descriptions are given on the assumption that the processor 81 performs the processes of all of the steps in the flow charts. Alternatively, a processor or a dedicated circuit other than the processor 81 may perform the processes of some of the steps in the flow charts. Yet alternatively, part of the processing performed by the main body apparatus 2 may be executed by another information processing apparatus capable of communicating with the main body apparatus 2 (e.g., a server capable of communicating with the main body apparatus 2 via a network). That is, all the processes shown in FIGS. 18 and 19 may be executed by the cooperation of a plurality of information processing apparatuses including the main body apparatus 2.

In FIG. 18, the processor 81 performs initialization in the game processing (step S160), and the processing proceeds to the next step. For example, in the initialization, the processor 81 initializes parameters for performing the processing described below. Further, in the initialization, the processor 81 performs the process of controlling the movement of the moving device 200 and sets the type and identification information of the moving device 200 (the apparatus for moving in real space) to which the left controller 3 and the right controller 4 are attached, where necessary. For example, the type of the moving device 200 to be subjected to the control process may be initialized by the user controlling the movement of the moving device 200 and performing the operation of selecting the type of the moving device 200, using the main body apparatus 2, the left controller 3, or the right controller 4.

Next, the processor 81 acquires operation data of an operation device (e.g., the touch panel 13) of the main body apparatus 2 and updates the operation data Da (step S161), and the processing proceeds to the next step. For example, using the position where the touch panel 13 is subjected to a touch operation, the processor 81 updates the operation data Da.

Next, the processor 81 acquires controller data from each of the left controller 3 and the right controller 4 and updates the controller data Db (step S162), and the processing proceeds to the next step. For example, in accordance with the controller data acquired from each of the left controller 3 and the right controller 4, the processor 81 updates the angular velocity data Db1, the acceleration data Db2, and the captured image data Db3.

Next, the processor 81 determines whether or not the moving device 200 is in the self-propelled mode (step S163). Then, when the moving device 200 is not in the self-propelled mode, the processing proceeds to step S164. On the other hand, when the moving device 200 is in the self-propelled mode, the processing proceeds to step S165. For example, when the self-propelled flag indicated by the self-propelled mode flag data Df is set to on, the processor 81 determines that the moving device 200 is in the self-propelled mode. Further, with reference to the operation data acquired in the above step S161, when it is indicated that the self-propelled mode selection button image IM1 (see FIG. 8) displayed on the display 12 is subjected to a touch operation, the processor 81 determines that the moving device 200 is in the self-propelled mode. It should be noted that with reference to the operation data acquired in the above step S161, when it is indicated that an operation button for cancelling the self-propelled mode displayed on the display 12 is subjected to a touch operation, the processor 81 sets the self-propelled flag indicated by the self-propelled mode flag data Df to off and also determines that the moving device 200 is not in the self-propelled mode.

In step S164, in accordance with a user operation, the processor 81 sets vibration data, and the processing proceeds to step S166. For example, with reference to the operation data Da, the processor 81 determines whether or not the left vibration button image IL and/or the right vibration button image IR (see FIG. 8) displayed on the display 12 are subjected to touch operations. Then, when the left vibration button image IL is subjected to a touch operation, the processor 81 performs the process of generating vibration data for vibrating the right controller 4. For example, the processor 81 generates a vibration waveform so that the right controller 4 vibrates with a predetermined amplitude at the frequency of a vibration to be imparted to the right controller 4 set in the frequency data Dg, and based on the vibration waveform, generates vibration data for vibrating the right controller 4. Then, the processor 81 updates the vibration data De. Further, when the right vibration button image IR is subjected to a touch operation, the processor 81 performs the process of generating vibration data for vibrating the left controller 3. For example, the processor 81 generates a vibration waveform so that the left controller 3 vibrates with a predetermined amplitude at the frequency of a vibration to be imparted to the left controller 3 set in the frequency data Dg, and based on the vibration waveform, generates vibration data for vibrating the left controller 3. Then, the processor 81 updates the vibration data De. It should be noted that when the left vibration button image IL is not subjected to a touch operation, the processor 81 generates vibration data for stopping the vibration of the right controller 4 (e.g., data indicating an instruction to stop the vibration, or data indicating a vibration waveform of which the amplitude and the frequency are 0), thereby updating the vibration data De. Further, when the right vibration button image IR is not subjected to a touch operation, the processor 81 generates vibration data for stopping the vibration of the left controller 3, thereby updating the vibration data De.

In step S166, the processor 81 calculates the orientations of the left controller 3 and the right controller 4, and the processing proceeds to the next step. For example, the processor 81 acquires data indicating accelerations generated in the left controller 3 from the acceleration data Db2, calculates the direction of a gravitational acceleration acting on the left controller 3, and updates the orientation data Dc of the left controller 3 using data indicating the direction. As a method for extracting a gravitational acceleration, any method may be used. For example, an acceleration component generated on average in the left controller 3 may be calculated and extracted as a gravitational acceleration. Then, the processor 81 acquires data indicating angular velocities generated in the left controller 3 from the angular velocity data Db1, calculates angular velocities about the xyz axes of the left controller 3, and calculates the xyz axis directions of the left controller 3 with respect to the direction of the gravitational acceleration using data indicating the angular velocities, thereby updating the orientation data Dc of the left controller 3. Further, the processor 81 acquires data indicating accelerations generated in the right controller 4 from the acceleration data Db2, calculates the direction of a gravitational acceleration acting on the right controller 4, and updates the orientation data Dc of the right controller 4 using data indicating the direction. Then, the processor 81 acquires data indicating angular velocities generated in the right controller 4 from the angular velocity data Db1, calculates the angular velocities about the xyz axes of the right controller 4, and calculates the xyz axis directions of the right controller 4 with respect to the direction of the gravitational acceleration using data indicating the angular velocities, thereby updating the orientation data Dc of the right controller 4.

It should be noted that after the xyz axis directions with respect to the gravitational acceleration are calculated, the orientations of the left controller 3 and the right controller 4 may be updated in accordance with only the angular velocities about the xyz axes. However, to prevent the relationship between the orientations of the left controller 3 and the right controller 4 and the direction of the gravitational acceleration from shifting due to erroneous accumulation, the xyz axis directions relative to the direction of the gravitational acceleration may be calculated every predetermined cycle, and the orientations of the left controller 3 and the right controller 4 may be corrected.

Next, the processor 81 determines whether or not the moving device 200 falls down (step S167). Then, when the moving device 200 falls down, the processing proceeds to step S168. On the other hand, when the moving device 200 does not fall down, the processing proceeds to step S169. For example, with reference to the orientation data Dc, when the directions of gravitational accelerations generated in the left controller 3 and/or the right controller 4 are not within a predetermined range including the positive z-axis direction, the processor 81 determines that the moving device 200 falls down.

In step S168, the processor 81 performs the process of notifying the user of the falling down, and the processing proceeds to step S169. As a first example, the processor 81 performs the process of displaying on the display 12 a notification image indicating that the moving device 200 falls down. As a second example, the processor 81 performs the process of outputting from the speakers 88 a notification sound indicating that the moving device 200 falls down. As a third example, the processor 81 sets the self-propelled flag indicated by the self-propelled mode flag data Df to off and also generates vibration data for stopping the vibrations of the left controller 3 and the right controller 4, thereby updating the vibration data De.

In step S169, the processor 81 determines whether or not a frequency adjustment operation is performed. Then, when the frequency adjustment operation is performed, the processing proceeds to step S170. On the other hand, when the frequency adjustment operation is not performed, the processing proceeds to step S171. For example, with reference to the operation data Da when the left vibration frequency adjustment bar image IFL and/or the right vibration frequency adjustment bar image IFR (see FIG. 8) displayed on the display 12 are subjected to touch operations, the processor 81 determines that the frequency adjustment operation is performed.

In step S170, the processor 81 performs a frequency adjustment process, and the processing proceeds to step S171. For example, when a drag operation for moving the operation handler image included in each of the left vibration frequency adjustment bar image IFL and/or the right vibration frequency adjustment bar image IFR is performed along the direction of the bar, the processor 81 performs the process of moving the operation handler image in accordance with the drag operation and displaying the operation handler image on the display 12. Then, when the display position of the operation handler image moves, the processor 81 newly sets a frequency setting value corresponding to the moved display position of the operation handler image and updates the frequency data Dg on the side corresponding to the operation handler image, using the new frequency setting value.

In step S171, the processor 81 performs the process of, in each cycle of transmitting vibration data, transmitting vibration data corresponding to this cycle to the left controller 3 and the right controller 4, and the processing proceeds to the next step. For example, with reference to the vibration data De, the processor 81 transmits vibration data of the left controller 3 for a vibration length corresponding to the transmission cycle to the left controller 3. Further, with reference to the vibration data De, the processor 81 transmits vibration data of the right controller 4 for a vibration length corresponding to the transmission cycle to the right controller 4. The vibration data for each controller is thus transmitted, whereby the left controller 3 and/or the right controller 4 receiving the vibration data vibrate based on vibration waveforms corresponding to the vibration data.

Next, the processor 81 performs the process of displaying images on the display 12 (step S172), and the processing proceeds to the next step. For example, the processor 81 performs the process of generating operation button images (see FIG. 8) in which the left vibration button image IL, the right vibration button image IR, the left vibration frequency adjustment bar image IFL, the right vibration frequency adjustment bar image IFR, the self-propelled mode selection button image IM1, the night-vision mode selection button image IM2, and the like are displayed, and displaying the operation button images on the display 12. Further, when a captured image captured by the infrared image capturing section 123 is acquired from the right controller 4, the processor 81 displays the captured image as the captured image IC on the display 12. Further, when a setting is made so that a notification of predetermined information (e.g., information indicating that the moving device 200 falls down) is displayed, the processor 81 performs the process of generating an image related to the information and displaying the image on the display 12.

Next, the processor 81 determines whether or not the game is to be ended (step S173). In the above step S173, examples of a condition for ending the game include: the fact that a condition for ending the game is satisfied; and the fact that the user performs the operation of ending the game. When the game is not to be ended, the processing returns to the above step S161, and the process of step S161 is repeated. When the game is to be ended, the processing of the flow chart ends. Hereinafter, the series of processes of steps S161 to S173 are repeatedly executed until it is determined in step S173 that the game is to be ended.

On the other hand, when it is determined in the above step S163 that the moving device 200 is in the self-propelled mode, the processor 81 performs a self-propelled mode process (step S165), and the processing proceeds to step S166. With reference to FIG. 19, a description is given of the self-propelled mode process performed in step S165.

In FIG. 19 the processor 81 analyzes a captured image captured by the infrared image capturing section 123 (step S181), and the processing proceeds to the next step. For example, the processor 81 performs a predetermined image recognition process (e.g., a pattern matching process using the shape of the recognition portion M) on a captured image indicated by the captured image data Db3, thereby extracting the recognition portion M captured in the captured image.

Next, the processor 81 determines whether or not the recognition portion M is captured in the captured image (step S182). Then, when the recognition portion M is captured in the captured image, the processing proceeds to step S183. On the other hand, when the recognition portion M is not captured in the captured image, the processing proceeds to step S184.

In step S183, the processor 81 sets vibration data based on the image capturing position of the recognition portion M, and the processing proceeds to step S185. For example, when the largest captured recognition portion M is captured in a center area of the captured image, the processor 81 sets vibration data for vibrating both the left controller 3 and the right controller 4, thereby updating the vibration data De. Further, when the largest captured recognition portion M is captured in an area (a left side area) to the left side of the center area of the captured image, the processor 81 sets vibration data for vibrating only the left controller 3, thereby updating the vibration data De. Further, when the largest captured recognition portion M is captured in an area (a right side area) to the right side of the center area of the captured image, the processor 81 sets vibration data for vibrating only the right controller 4, thereby updating the vibration data De. It should be noted that a method for generating a vibration waveform for vibrating each controller is similar to that in the above step S164, and therefore is not described in detail here.

It should be noted that in the process of the above step S183, when a plurality of recognition portions M are captured in the captured image captured by the infrared image capturing section 123, the largest captured recognition portion M (i.e., the recognition portion M closest to the viewpoint of the infrared image capturing section 123) is a processing target (i.e., a movement target). Alternatively, the processing target may be selected based on another criterion. For example, when a plurality of recognition portions M are captured in the captured image captured by the infrared image capturing section 123, the recognition portion M captured at the position closest to the center position of the captured image (i.e., the recognition portion M furthest in the moving direction) may be a processing target (i.e., a movement target).

Further, in the process of the above step S183, when the size of the recognition portion M captured in the captured image captured by the infrared image capturing section 123 is equal to or greater than a predetermined size, the vibrations of both the left controller 3 and the right controller 4 may be stopped. In this case, in accordance with the fact that the distance between the moving device 200 and the recognition portion M comes close to a distance less than a predetermined distance, the movement of the moving device 200 can be stopped.

In step S184, the processor 81 sets vibration data determined in advance, and the processing proceeds to step S185. For example, the processor 81 sets vibration data for vibrating both the left controller 3 and the right controller 4, thereby updating the vibration data De. It should be noted that a method for generating a vibration waveform for vibrating each controller is similar to that in the above step S164, and therefore is not described in detail here.

In step S185, the processor 81 sets the self-propelled flag indicated by the self-propelled mode flag data Df to on, and the processing of this subroutine ends.

As described above, in the exemplary embodiment, vibrations are imparted to the moving device 200, whereby it is possible to move the moving device 200 on a predetermined surface in real space. Two independent vibrations to be imparted to the moving device 200 are controlled, whereby it is possible to vary movements by vibrations.

It should be noted that in the above description, a user interface for performing touch operations on the operation button images displayed on the display 12 of the main body apparatus 2 is used as an operation section. Alternatively, an operation section in another form may be used. For example, the movement of the moving device 200 may be controlled using various operation sections such as an operation button capable of being subjected to a pressing operation, a stick capable of being subjected to a tilt operation, a mouse capable of being subjected to a pointing operation, a touch pad capable of being subjected to a touch operation, and a user action detection system capable of recognizing a user action (a gesture).

Further, in the exemplary embodiment, the form is used in which the vibrations of the right controller 4 and/or the left controller 3 are turned on and off in accordance with whether or not the left vibration button image IL and/or the right vibration button image IR (see FIG. 8) are subjected to touch operations. Alternatively, the amplitudes or the frequencies of the vibrations may change. As a first example, control may be performed so that in accordance with whether or not the left vibration button image IL and/or the right vibration button image IR are subjected to touch operations, the amplitudes or the frequencies of the vibrations of the right controller 4 and/or the left controller 3 are changed. As a second example, control may be performed so that in accordance with touch positions or drag directions in the left vibration button image IL and/or the right vibration button image IR when the left vibration button image IL and/or the right vibration button image IR are subjected to touch operations, the amplitudes or the frequencies of the vibrations of the right controller 4 and/or the left controller 3 are changed. As a third example, control may be performed so that in accordance with the continuation time in which touch operations on the left vibration button image IL and/or the right vibration button image IR continue (the left vibration button image IL and/or the right vibration button image IR are subjected to long-press operations), the amplitudes or the frequencies of the vibrations of the right controller 4 and/or the left controller 3 are changed.

Further, in the above description, an example has been used where two independent vibrations are controlled, thereby controlling the movement of the moving device 200 when the moving device 200 moves on a predetermined surface in real space. Alternatively, another type of control may be performed on the moving device 200 using vibrations. For example, two independent vibrations may be controlled, thereby controlling the rotation direction or the rotation speed of the moving device 200 when the moving device 200 rotates on a predetermined surface in real space.

Further, in the above description, an example has been used where the left controller 3 and the right controller 4 are attached to the moving object 201 such that the longitudinal direction of the left controller 3 and the longitudinal direction of the right controller 4 are parallel to each other, and the left controller 3 and the right controller 4 have the same height. Alternatively, the left controller 3 and the right controller 4 may be attached such that the longitudinal direction of the left controller 3 and the longitudinal direction of the right controller 4 are different directions, or the left controller 3 and the right controller 4 may be attached such that the left controller 3 and the right controller 4 have different heights. The left controller 3 and the right controller 4 may be attached in appropriate places and/or appropriate directions in accordance with the shape or the running performance of the moving object 201.

Further, in the above exemplary embodiment, the method for detecting the motions and the orientations of the left controller 3 and the right controller 4 is merely illustrative, and the motions and the orientations of the left controller 3 and the right controller 4 may be detected using another method or other data. For example, the orientations of the left controller 3 and the right controller 4 are calculated based only on angular velocities generated in each of the left controller 3 and the right controller 4, or calculated by combining angular velocities and accelerations generated in each of the left controller 3 and the right controller 4. Alternatively, the orientations may be calculated based only on accelerations generated in each of the left controller 3 and the right controller 4. Even when accelerations generated in each of the left controller 3 and the right controller 4 are detected, it is possible to calculate the direction in which a gravitational acceleration is generated in each of the left controller 3 and the right controller 4. It goes without saying that it is possible to perform processing similar to that described above in the exemplary embodiment by sequentially calculating the xyz axis directions with respect to the gravitational acceleration. Further, in the above exemplary embodiment, the operation button images for controlling the movement of the moving device 200 are displayed on the display 12 of the main body apparatus 2. Alternatively, the operation button images may be displayed on the stationary monitor via the cradle.

Further, each of the main body apparatus 2, the left controller 3, and the right controller 4 may be any apparatus, and may be a mobile game apparatus, any mobile electronic device (a PDA (Personal Digital Assistant), a mobile phone, a personal computer, a camera, a tablet, or the like) or the like.

Further, the above descriptions have been given using an example where the main body apparatus 2 performs information processing (game processing) and a communication process. Alternatively, another apparatus may perform at least some of the processing steps. For example, if the main body apparatus 2 is further configured to communicate with another apparatus (e.g., another server, another image display device, another game apparatus, or another mobile terminal), the other apparatus may cooperate to perform the processing steps. Another apparatus may thus perform at least some of the processing steps, thereby enabling processing similar to that described above. Further, the above information processing (game processing) can be performed by a processor or the cooperation of a plurality of processors, the processor or the plurality of processors included in an information processing system including at least one information processing apparatus. Further, in the above exemplary embodiment, information processing can be performed by the processor 81 of the main body apparatus 2 executing a predetermined program. Alternatively, part or all of the processing of the flow charts may be performed by a dedicated circuit included in the main body apparatus 2.

Here, according to the above variations, it is possible to achieve the exemplary embodiment also by a system form such as cloud computing, or a system form such as a distributed wide area network or a local area network. For example, in a system form such as a distributed local area network, it is possible to execute the processing between a stationary information processing apparatus (a stationary game apparatus) and a mobile information processing apparatus (a mobile game apparatus) by the cooperation of the apparatuses. It should be noted that, in these system forms, there is no particular limitation on which apparatus performs the above processing. Thus, it goes without saying that it is possible to achieve the exemplary embodiment by sharing the processing in any manner.

Further, the processing orders, the setting values, the conditions used in the determinations, and the like that are used in the information processing described above are merely illustrative. Thus, it goes without saying that the exemplary embodiment can be achieved also with other orders, other values, and other conditions.

Further, the above program may be supplied to the main body apparatus 2 not only through an external storage medium such as an external memory, but also through a wired or wireless communication link. Further, the program may be stored in advance in a non-volatile storage device included in the apparatus. It should be noted that examples of an information storage medium having stored therein the program may include CD-ROMs, DVDs, optical disk storage media similar to these, flexible disks, hard disks, magneto-optical disks, and magnetic tapes, as well as non-volatile memories. Alternatively, an information storage medium having stored therein the program may be a volatile memory for storing the program. It can be said that such a storage medium is a storage medium readable by a computer or the like. For example, it is possible to provide the various functions described above by causing a computer or the like to load a program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. When used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment can be used as an apparatus movement system, an apparatus, an apparatus movement control method, an apparatus movement control program, a cardboard member, and the like that are capable of improving the variety of movements using vibrations.

What is claimed is:

1. A system for controlling a movement of an apparatus, comprising:
    a game apparatus having processing circuitry including at least one processor and a display configured to accept touch input;
    a first game controller having a vibration device for vibrating the first game controller;
    a second game controller having a vibration device for vibrating the second game controller, the first and second game controllers configured to be attached to and detached from the game apparatus; and
    a movement apparatus, comprising:
        a first slit;
        a second slit;
        a first grounded portion; and
        a second grounded portion,
    the first and second game controllers are configured to control the game apparatus based on signals input to the first and second game controllers, and the game apparatus is configured to control an image displayed on the display that accepts touch input,
    the first game controller is configured to detach from the game apparatus and attach to the movement apparatus by insertion into the first slit, and the second game controller is configured to detach from the game apparatus and attach to the movement apparatus by insertion into the second slit, and
    the movement apparatus is configured to move by vibration, using at least the first and second grounded portions, based on the game apparatus control of the vibration devices of the first and second game controllers, from the touch input provided to the display, when the first and second game controllers are attached to the movement apparatus.

2. The system according to claim 1, wherein
    the first slit is on a left side of the movement apparatus with respect to a moving direction of the movement apparatus, and the second slit is on a right side of the movement apparatus with respect to the moving direction of the movement apparatus.

3. The system according to claim 1, wherein
the first grounded portion is on a left side of the movement apparatus with respect to a moving direction of the movement apparatus, and
the second grounded portion is on a right side of the movement apparatus with respect to the moving direction of the movement apparatus.

4. The system according to claim 1, wherein the movement apparatus comprises:
a main body;
a first housing comprising the first slit; and
a second housing comprising the second slit, and
the main body comprises:
a first engagement portion configured to be detachably engaged with the first housing; and
a second engagement portion configured to be detachably engaged with the second housing.

5. The system according to claim 4, wherein
the main body is formed by folding one or more cardboard pieces.

6. The system according to claim 4, wherein
the first engagement portion comprises a first fitting portion configured to fit at least a part of the first housing, and
the second engagement portion comprises a second fitting portion configured to fit at least a part of the second housing.

7. The system according to claim 6, wherein
the first fitting portion is formed so as to fit at least a part of the first housing near a place where the first slit is installed in the first housing, and
the second fitting portion is formed so as to fit at least a part of the second housing near a place where the second slit is installed in the second housing.

8. The system according to claim 1, wherein
frequencies at which the first controller and/or the second controller vibrate are set.

9. The system according to claim 1, wherein
the first controller comprises an image capturing device configured to capture an image of a portion around the movement apparatus.

10. The system according to claim 1, wherein
the first grounded portion has at least three portions of the movement apparatus that are grounded, and
the second grounded portion has at least three portions of the movement apparatus that are grounded.

11. The system according to claim 1, wherein
the processing circuitry further detects an orientation of the movement apparatus, and
based on a detection result of the orientation, the processing circuitry estimates a situation where the apparatus moves.

12. A movement apparatus, comprising:
a first slit having a narrow portion and a wide portion, the first slit configured to attach the movement apparatus to a first game controller, the first game controller having a vibration device for vibrating the first game controller;
a second slit having a narrow portion and a wide portion, the second slit configured to attach the movement apparatus to a second game controller, the second game controller having a vibration device for vibrating the second game controller, the first and second game controllers configured to be attached to and detached from a game apparatus;
a first grounded portion having at least a first leg; and
a second grounded portion having at least a second leg, wherein
the first and second game controllers are configured to control the game apparatus based on signals input to the first and second game controllers, and the game apparatus is configured to control an image displayed on a display of the game apparatus,
the first game controller is configured to detach from the game apparatus and attach to the movement apparatus by insertion into the first slit, and the second game controller is configured to detach from the game apparatus and attach to the movement apparatus by insertion into the second slit,
the movement apparatus is configured to stand on a horizontal surface and move on the horizontal surface by vibration, using at least the first and second grounded portions, based on the game apparatus control of the vibration devices of the first and second game controllers, from input provided to the display of the game apparatus, when the first and second game controllers are attached to the movement apparatus,
the first and second slits are inclined relative to a horizontal direction of the movement apparatus in a state where the movement apparatus is standing,
the narrow portion of the first and second slits are positioned above the first and second legs, and
the narrow portion of the first and second slits are positioned lower than the wide portion of the first and second slits when the movement apparatus is in the state where the movement apparatus is standing.

13. The system according to claim 12, wherein the wide portion of the first and second slits is open, and the narrow portion of the first and second slits is closed.

14. A cardboard member configured to form an apparatus to and from which a first game controller comprising a first vibration device and a second game controller comprising a second vibration device are attached and detached, the apparatus comprising:
a first slit with which the first game controller is detachably engaged by fitting at least a slider of the first game controller into at least a portion of the first slit from an insertion side of the first slit, the first slit having a narrow slit portion and wide slit portion, and the slider of the first game controller fits into the first slit at the narrow slit portion;
a second slit with which the second game controller is detachably engaged by fitting at least a slider of the second game controller into at least a portion of the second slit from an insertion side of the second slit, the second slit having a narrow slit portion and a wide slit portion, and the slider of the second game controller fits into the second slit at the narrow slit portion;
a first grounded portion having at least a first leg, and is configured to vibrate in accordance with a vibration of at least the first vibration device of the first game controller attached to the apparatus; and
a second grounded portion having at least a second leg, and is configured to vibrate in accordance with a vibration of at least the second vibration device of the second game controller attached to the apparatus, wherein
the cardboard member is folded, thereby integrally forming the apparatus, and the apparatus is configured to stand on a horizontal surface and move on the horizontal surface by vibration, using at least the first and second grounded portions, the slider of the first game controller is configured to be inserted in a sliding manner from a rear direction of the apparatus to a front direction and fit into the first slit relative to a front side of the apparatus, the slider of the second game controller is configured to be inserted in the sliding manner from the rear direction of the apparatus to the front direction and fit into the second slit relative to the front side of the apparatus, the first and second slits are inclined relative to a horizontal direction of the apparatus in a state where the apparatus is standing, the narrow slit portion of the first and second slits are positioned above the first and second legs, and the narrow slit portion of the first and second slits are positioned lower than the wide slit portion of the first and second slits when the apparatus is in the state where the apparatus is standing.

15. The cardboard member of claim 14, wherein the narrow slit portion of the first slit is positioned near an end of the first slit opposite to the insertion side of the first slit, and the narrow slit portion of the second slit is positioned near an end of the second slit opposite to the insertion side of the second slit.

16. The cardboard member of claim 14, wherein the slider of the first game controller and the slider of the second game controller are inserted into the first and second slits, respectively, in the sliding manner in one direction.

17. The cardboard member of claim 14, wherein a slit width on a first side of the first and second slits is narrower than a slit width on a second side of the first and second slits.

18. The cardboard member of claim 14, wherein the first slit is provided on a first side surface of the apparatus, and the second slit is provided on a second side surface of the apparatus.

19. A cardboard member configured to form an apparatus to and from which a first game controller, comprising a first vibration device, and a second game controller, comprising a second vibration device, are attached and detached, the apparatus comprising:
   a first leg;
   a second leg;
   a first slit with which the first game controller is detachably engaged by fitting at least a slider of the first game controller into at least a portion of the first slit from an insertion side of the first slit, the first slit having a narrow slit portion and a wide slit portion, and the slider of the first game controller fits into the first slit at the narrow slit portion;
   a second slit with which the second game controller is detachably engaged by fitting at least a slider of the second game controller into at least a portion of the second slit from an insertion side of the second slit, the second slit having a narrow slit portion and a wide slit portion, and the slider of the second game controller fits into the second slit at the narrow slit portion, wherein the cardboard member is folded, thereby integrally forming the apparatus, and the apparatus is configured to stand on a horizontal surface and move on the horizontal surface by vibration, using at least the first and second legs, the slider of the first game controller is configured to be inserted in a sliding manner from a rear direction of the apparatus to a front direction, the slider of the second game controller is configured to be inserted in the sliding manner from the rear direction of the apparatus to the front direction, the first and second slits are inclined relative to a horizontal direction of the apparatus in a state where the apparatus is standing, the narrow slit portion of the first and second slits are positioned above the first and second legs, and the narrow slit portion of the first and second slits are positioned lower than the wide slit portion of the first and second slits when the apparatus is in the state where the apparatus is standing.

20. An apparatus comprising:
   a first slit having a narrow portion and a wide portion, the first slit configured to attach a first game controller to the apparatus by insertion into the first slit;
   a second slit having a narrow portion and a wide portion, the second slit configured to attach a second game controller to the apparatus by insertion into the second slit, the first and second game controllers configured to be attached to and detached from a game apparatus, and the first and second game controllers each having a vibration device;
   a first grounded portion having at least a first leg; and
   a second grounded portion having at least a second leg, wherein the apparatus is configured to stand on a horizontal surface and move on the horizontal surface by vibration, using at least the first and second grounded portions, based on the game apparatus control of the vibration devices of the first and second game controllers, from input provided to the game apparatus, when the first and second game controllers are attached to the apparatus, the first and second slits are inclined relative to a horizontal direction of the apparatus in a state where the apparatus is standing, the narrow portion of the first and second slits are positioned above the first and second legs, and the narrow portion of the first and second slits are positioned lower than the wide portion of the first and second slits when the apparatus is in the state where the apparatus is standing.

* * * * *